(12) United States Patent
Sarkar et al.

(10) Patent No.: US 12,405,193 B2
(45) Date of Patent: **\*Sep. 2, 2025**

(54) ITERATIVE DIRECT EXPANSION MICROSCOPY

(71) Applicant: Massachusetts Institute of Technology, Cambridge, MA (US)

(72) Inventors: Deblina Sarkar, Cambridge, MA (US); Edward Stuart Boyden, Chestnut Hill, MA (US); Asmamaw T. Wassie, Boston, MA (US); Jinyoung Kang, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 702 days.

This patent is subject to a terminal disclaimer.

(21) Appl. No.: 16/794,849

(22) Filed: Feb. 19, 2020

(65) Prior Publication Data

US 2020/0271556 A1 Aug. 27, 2020

Related U.S. Application Data

(60) Provisional application No. 62/809,062, filed on Feb. 22, 2019.

(51) Int. Cl.
*G01N 1/36* (2006.01)
*G01N 1/28* (2006.01)
(52) U.S. Cl.
CPC ............... *G01N 1/36* (2013.01); *G01N 1/28* (2013.01); *G01N 1/286* (2013.01); *G01N 2001/2873* (2013.01)

(58) Field of Classification Search
CPC ................................. G01N 1/36; G01N 1/28
See application file for complete search history.

(56) References Cited

U.S. PATENT DOCUMENTS 5,840,862 A   11/1998   Bensimon et al.
5,952,232 A    9/1999   Rothman
(Continued)

FOREIGN PATENT DOCUMENTS

CN    104350372 A    2/2015
CN    111848855 A    10/2020
(Continued)

OTHER PUBLICATIONS

Chen et al., Nature Methods 13(8): 679-684 (2016).\*
(Continued)

*Primary Examiner* — Erin M. Bowers
(74) *Attorney, Agent, or Firm* — Pierce Atwood LLP

(57) ABSTRACT

The present invention provides biological samples of interest that have been iteratively expanded in a method referred to herein as iterative direct expansion microscopy (id-ExM). In the id-ExM method, biological samples of interest are permeated with a swellable material that results in the sample becoming embedded in the swellable material, and then the sample can be expanded isotropically in three dimensions. The process of iteratively expanding the samples can be applied to expand samples one or more additional times such that, for example, a 5-fold expanded sample can be expanded again to achieve high expansion factors, for example, 20× to 100× or more linear expansion.

34 Claims, 22 Drawing Sheets
(19 of 22 Drawing Sheet(s) Filed in Color)

(56) References Cited

U.S. PATENT DOCUMENTS

| | | | |
|---|---|---|---|
| 6,107,081 A | 8/2000 | Feeback et al. |
| 6,204,064 B1 | 3/2001 | Alberts et al. |
| 6,271,278 B1 | 8/2001 | Park et al. |
| 6,287,870 B1 | 9/2001 | Wardlaw et al. |
| 6,548,255 B2 | 4/2003 | Bensimon et al. |
| 9,376,677 B2 | 6/2016 | Mir |
| 10,059,990 B2 | 8/2018 | Boyden et al. |
| 10,309,879 B2 | 6/2019 | Chen et al. |
| 10,317,321 B2 | 6/2019 | Tillberg et al. |
| 10,364,457 B2 | 7/2019 | Wassie et al. |
| 10,526,649 B2 | 1/2020 | Chen et al. |
| 10,563,257 B2 | 2/2020 | Boyden et al. |
| 10,774,367 B2 | 9/2020 | Fraser et al. |
| 10,995,361 B2 | 5/2021 | Chen et al. |
| 11,180,804 B2 | 11/2021 | Chen et al. |
| 11,408,890 B2 | 8/2022 | Boyden et al. |
| 2002/0176880 A1 | 11/2002 | Cruise et al. |
| 2003/0120231 A1 | 6/2003 | Wang et al. |
| 2004/0115629 A1 | 6/2004 | Panzer et al. |
| 2004/0137527 A1 | 7/2004 | Sleytr et al. |
| 2004/0209317 A1 | 10/2004 | Ting |
| 2004/0214211 A1 | 10/2004 | Gilmanshin et al. |
| 2004/0248326 A1 | 12/2004 | Ziaie et al. |
| 2005/0034990 A1 | 2/2005 | Crooks et al. |
| 2005/0069877 A1 | 3/2005 | Gandhi et al. |
| 2005/0090016 A1 | 4/2005 | Rich et al. |
| 2005/0169962 A1 | 8/2005 | Bhatia et al. |
| 2005/0196702 A1 | 9/2005 | Bryant et al. |
| 2006/0000767 A1 | 1/2006 | Trauger et al. |
| 2006/0003356 A1 | 1/2006 | Shaw et al. |
| 2006/0110760 A1 | 5/2006 | Kim et al. |
| 2006/0115146 A1 | 6/2006 | Ogura et al. |
| 2006/0165912 A1 | 7/2006 | Koberstein et al. |
| 2007/0023942 A1 | 2/2007 | Andino et al. |
| 2007/0026432 A1 | 2/2007 | Ke et al. |
| 2007/0042954 A1 | 2/2007 | Chen et al. |
| 2007/0134902 A1 | 6/2007 | Bertino et al. |
| 2007/0177786 A1 | 8/2007 | Bartels |
| 2008/0139407 A1 | 6/2008 | Slootstra et al. |
| 2008/0261834 A1 | 10/2008 | Simon et al. |
| 2008/0286360 A1 | 11/2008 | Shoichet et al. |
| 2009/0011141 A1 | 1/2009 | Carter et al. |
| 2009/0011420 A1 | 1/2009 | Barron et al. |
| 2009/0096133 A1 | 4/2009 | Doyle et al. |
| 2009/0191627 A1 | 7/2009 | Fadeev et al. |
| 2009/0241681 A1 | 10/2009 | Machauf et al. |
| 2010/0041128 A1 | 2/2010 | Banes et al. |
| 2010/0055161 A1 | 3/2010 | Ahn |
| 2010/0056445 A1 | 3/2010 | Sharma et al. |
| 2010/0068725 A1 | 3/2010 | Armbruster et al. |
| 2010/0096334 A1 | 4/2010 | Edmiston et al. |
| 2010/0111396 A1 | 5/2010 | Boucheron |
| 2010/0119755 A1 | 5/2010 | Chung et al. |
| 2010/0248977 A1 | 9/2010 | Johnston et al. |
| 2011/0009171 A1 | 1/2011 | Watanabe et al. |
| 2011/0070604 A1 | 3/2011 | Gimzewski et al. |
| 2011/0087315 A1 | 4/2011 | Richardson-Burns et al. |
| 2011/0091717 A1 | 4/2011 | Weiss et al. |
| 2011/0091922 A1 | 4/2011 | Krishnan et al. |
| 2011/0291357 A1 | 12/2011 | Boyle |
| 2012/0025271 A1 | 2/2012 | Nakano |
| 2012/0184670 A1 | 7/2012 | Kobayashi et al. |
| 2012/0220478 A1 | 8/2012 | Shaffer |
| 2012/0251527 A1 | 10/2012 | Reiser |
| 2012/0310223 A1 | 12/2012 | Knox et al. |
| 2013/0045503 A1 | 2/2013 | Miyawaki et al. |
| 2013/0203605 A1 | 8/2013 | Shendure et al. |
| 2014/0087139 A1 | 3/2014 | Rowley et al. |
| 2014/0193651 A1 | 7/2014 | Kharlampieva et al. |
| 2014/0364330 A1 | 12/2014 | Mershin et al. |
| 2015/0086103 A1 | 3/2015 | Tsunomori |
| 2015/0087001 A1 | 3/2015 | Gradinaru et al. |
| 2015/0226743 A1 | 8/2015 | Weiss et al. |
| 2015/0353989 A1 | 12/2015 | Fraser et al. |
| 2015/0370961 A1 | 12/2015 | Zhang et al. |
| 2015/0376261 A1 | 12/2015 | Steyaert et al. |
| 2016/0116384 A1 | 4/2016 | Chen et al. |
| 2016/0252528 A1 | 9/2016 | Sangaralingham et al. |
| 2016/0265046 A1 | 9/2016 | Zhang et al. |
| 2016/0304952 A1 | 10/2016 | Boyden et al. |
| 2016/0305856 A1* | 10/2016 | Boyden .................. G01N 1/36 |
| 2017/0067096 A1 | 3/2017 | Wassie et al. |
| 2017/0081489 A1 | 3/2017 | Boyden et al. |
| 2017/0087489 A1 | 3/2017 | Terlingen et al. |
| 2017/0089811 A1 | 3/2017 | Chen et al. |
| 2017/0103521 A1 | 4/2017 | Chukka et al. |
| 2017/0182220 A1 | 6/2017 | Song et al. |
| 2017/0199104 A1 | 7/2017 | Gradinaru et al. |
| 2017/0276598 A1 | 9/2017 | Ikuyama |
| 2017/0323431 A1 | 11/2017 | Sarkar et al. |
| 2018/0119219 A1 | 5/2018 | Chen et al. |
| 2019/0064037 A1 | 2/2019 | Boyden et al. |
| 2019/0071656 A1 | 3/2019 | Chang et al. |
| 2019/0113423 A1 | 4/2019 | Goodman et al. |
| 2019/0194709 A1 | 6/2019 | Church et al. |
| 2019/0256633 A1 | 8/2019 | Gao et al. |
| 2020/0041614 A1 | 2/2020 | Donovan et al. |
| 2020/0049599 A1 | 2/2020 | Alexander et al. |
| 2020/0081005 A1 | 3/2020 | Boyden et al. |
| 2020/0217853 A1 | 7/2020 | Estandian et al. |
| 2020/0277664 A1 | 9/2020 | Frenz |
| 2021/0130882 A1 | 5/2021 | Boyden et al. |
| 2021/0190652 A1 | 6/2021 | Quevedo et al. |
| 2021/0196856 A1 | 7/2021 | Boyden et al. |
| 2023/0332207 A1 | 10/2023 | Cui et al. |

FOREIGN PATENT DOCUMENTS

| | | | |
|---|---|---|---|
| CN | 112574089 A | 3/2021 |
| EP | 3159361 A1 | 4/2017 |
| JP | 2005291759 A | 10/2005 |
| JP | 2006036957 A | 2/2006 |
| JP | 2008286694 A | 11/2008 |
| JP | 2009191125 A | 8/2009 |
| JP | 2014005231 A | 1/2014 |
| WO | 0008212 A1 | 2/2000 |
| WO | 2007103665 A2 | 9/2007 |
| WO | 2008058302 A1 | 5/2008 |
| WO | 2010048605 A1 | 4/2010 |
| WO | 2012112689 A1 | 8/2012 |
| WO | 2012142664 A1 | 10/2012 |
| WO | 2014025392 A1 | 2/2014 |
| WO | 2014152984 A1 | 9/2014 |
| WO | 2015041755 A1 | 3/2015 |
| WO | 2015127183 A2 | 8/2015 |
| WO | 2016040489 A1 | 3/2016 |
| WO | 2017027367 A1 | 2/2017 |
| WO | 2017027368 A1 | 2/2017 |
| WO | 2017051249 | 2/2017 |
| WO | 2017079406 A1 | 5/2017 |
| WO | 2017147435 A1 | 8/2017 |
| WO | 2018157074 A1 | 8/2018 |
| WO | 2019144391 A1 | 8/2019 |
| WO | 2021051011 A1 | 3/2021 |
| WO | 2021183667 A1 | 9/2021 |
| WO | 2022100696 A1 | 3/2022 |

OTHER PUBLICATIONS

New England BioLabs, "Proteinase K", P8102S product datasheet, 1 page, accessed Nov. 17, 2020.

Product information brochure, FLOCRYL™ MBA, SNF Floerger, pp. 1-4, accessed Nov. 17, 2020.

"Crosslinking and Photoactivatable Reagents", Invitrogen, Chapter 5 in "Molecular Probes™ Handbook A Guide to Fluorescent Probes and Labeling Technologies", 11th Edition, 2010, 171-188.

"Proteinase K from Tritirachium album, solution", Serva Electrophoresis, Instruction Manual, Cat. No. 33755, 1 page, publicly available prior to Feb. 1, 2017.

Akhavan, A. et al., "Molecular Epizootiology of Rodent Leishmaniasis in a Hyperendemic Area of Iran", Iranian J Publ Health, vol. 39, No. 1, 2010, 1-7.

(56) References Cited

OTHER PUBLICATIONS

Asano, S. M. et al., "Expansion Microscopy: Protocols for Imaging Proteins and RNA in Cells and Tissues", Current Protocols in Cell Bio., vol. 80, No. 1, Online: DOI: 10.1002/cpcb.56. Retrieved from the Internet: URL:https://onlinelibrary.wiley.com/doi/full-XML/10. 1002/cpcb.56> [retrieved on Feb. 26, 2021], Sept. 2, 2018, p. 41.
Meng, H. , "Localization of a Blood Pressure Quantitative Trait Locus (QTL) to a 1.7cM Interval on Rat Chromosome 9", Medical College of Ohio, dissertation, 2002, 1-158.
Parang, B. et al., "Myeloid translocation genes differentially regulate colorectal cancer programs", Oncogene, vol. 35, 2016, 6341-6349.
Yu, C-C et al., "Expansion microscopy of C. elegans", ELIFE, [Online] DOI: 10.7554/eLife.46249. Retrieved from the Internet: URL:https://elifesciences.org/articles/46249> [retrieved on Feb. 26, 2021], May 1, 2020, pp. 125.
Office Action dated Apr. 4, 2018 from U.S. Appl. No. 14/627,310, filed Feb. 20, 2015.
"Epitope Recovery Methods for IHC", Nov. 7, 2015, ThermoFisher Scientific, pp. 1-2.
Al, H. et al., "Exploration of new chromophore structures leads to the identification of improved blue fluorescent proteins", Biochemistry, 46, 2007, 5904-10.
Bates, M. et al., "Multicolor super-resolution imaging with photo-switchable fluorescent probes", Science, 317, 2007, 1749-1753.
Batish, M. et al., "Neuronal mRNAs Travel Singly into Dendrites", PNAS, vol. 109(12), 2012, 4645-4650.
Beliveau, B. et al., "Versatile design and synthesis platform for visualizing genomes with Oligopaint FISH probes", PNAS, vol. 109(52): pfa, 2012, 21301-21306.
Bi, X. et al., "In situ-forming cross-linking hydrogel systems: chemistry and biomedical applications", In: "Emerging Concepts in Analysis and Applications of Hydrogels", INTECH, Aug. 24, 2016, 131-158.
Bleckmann, J. et al., "Surface-Layer Lattices as Patterning Element for Multimeric Extremozymes", Small Journal, 2013, 1-8.
Bokman, S. H. et al., "Renaturation of Aequorea gree-fluorescent protein", Biochem. Biophys. Res. Commun., 101, 1981, 1372-80.
Bossi, M. et al., "Multicolor far-field fluorescence nanoscopy through isolated detection of distinct molecular species", Nano Lett., 8, 2008, 2463-8.
Breitwieser, A. et al., "Magnetic Beads Functionalized with Recombinant S-Layer Protein Exhibit High Human IgG-Binding and Anti-Fouling Properties", Current Topics in Peptide & Protein Research, vol. 17, 2016, 45-55.
Bruchez, M. et al., "Semiconductor nanocrystals as fluorescent biological labels", Science, vol. 281, 1998, 2013-6.
Buckley, P. et al., "Cytoplasmic Intron Sequence-Retaining Transcripts Can Be Dendritically Targeted via ID Element Retrotransposons", Neuron, vol. 69, 2011, 877-884.
Buenrostro, J. D. et al., "ATAC-seq: A Method for Assaying Chromatin Accessibility Genome-Wide : ATAC-seq for Assaying Chromatin Accessibility", In: "Current Protocols in Molecular Biology", Wiley, New York, NY, Jan. 5, 2015.
Buxbaum, A. et al., "Single-Actin mRNA Detection in Neurons Reveals a Mechanism for Regulating Its Translatability", Science, vol. 343, 2014, 419-422.
Cabili, M. et al., "Localization and abundance analysis of human lncRNAs at single-cell and single-molecule resolution", Genome Biology, vol. 16(20), 2015.
Cal, et al., Nat Meth., 10, 2013, 540-547.
Cajigas, I. et al., "The local transcriptome in the synaptic neuropil revealed by deep sequencing and high-resolution imaging", Neuron 74, 2012, 453-466.
Cao, W. , "DNA ligases and ligase-based technologies", Clinical and Applied Immunology Reviews, Elsevier, Amsterdam, NL, vol. 2, No. 1, Jan. 15, 2001, 33-43.
Carpenter, A. E. et al., "CellProfiler: image analysis software for identifying and quantifying cell phenotypes", Genome Biol., 7, 2006, R100.

Chang, J-B et al., "Iterative expansion microscopy", Nature Methods, 14(6), Jun. 2017, 593-599.
Chen, F. et al., "Expansion Microscopy", Science, 347(6621):, Jan. 15, 2015, 1-18.
Chen, F. et al., "Nanoscale Imaging of RNA with Expansion Microscopy", Nature Methods, 13(8):, Aug. 2016, 679-684.
Chen, F. et al., "Supplementary Material for Expansion Microscopy", Science, 347(6221), Jan. 15, 2015, 543-548.
Chen, K. et al., "Spatially resolved, highly multiplexed RNA profiling in single cells", Science. vol. 348(6233), 2015, aaa6090-aaa6090.
Choi, H. et al., "Next-Generation in Situ Hybridization Chain Reaction: Higher Gain, Lower Cost, Greater Durability", ACS Nano 8(5), 2014, 4284-4294.
Choi, H. et al., "Programmable in situ amplification for multiplexed imaging of mRNA expression", Nature Biotechnology, 28(11), 2010, 1208-1212.
Chozinski, T. et al., "Expansion microscopy with conventional antibodies and fluorescent proteins", Nature Methods, vol. 13(6), 2016, 485-491.
Chu, J. et al., "Non-invasive intravital imaging of cellular differentiation with a bright red-excitable fluorescent protein", Nat. Methods, 11, 2014, 572-8.
Clemson, C. et al., "An architectural role for a nuclear noncoding RNA: NEAT1 RNA is essential for the structure of paraspeckles", Molecular Cell, 33, 2009, 717-26.
Cormack, B. P. et al., "FACS-optimized mutants of the green fluorescent protein (GFP)", Gene, 173, 1996, 33-8.
Cubitt, A. B. et al., "Understanding structure-function relationships in the *Aequorea victoria* green fluorescent protein", Methods Cell Biol., 58, 1999, 19-30.
Dedecker, P. et al., "Localizer: fast, accurate, open-source, and modular software package for superresolution microscopy", J. Biomed. Opt., 17, 2012, 126008.
Dilorenzo, F. et al., "Nanostructural Heterogeneity in Polymer Networks and Gels", Polymer Chemistry, vol. 6, 215, 5515-5528.
Edelstein, A. et al., "Computer control of microscopes using µManager", Curr. Protoc. Mol. Biol. Chapter 14, Unit14.20, 2010.
English, B. P. et al., "A three-camera imaging microscope for high-speed single-molecule tracking and super-resolution imaging in living cells", in SPIE Nanosci. + Eng. (Mohseni, H., Agahi, M. H. & Razeghi, M.) 955008 (International Society for Optics and Photonics, 2015). doi: 10.1117/12.2190246.
Engreitz, J. et al., "The Xist lncRNA exploits three-dimensional genome architecture to spread across the X chromosome", Science 341, 2013, 1237973.
Femino, A. et al., "Visualization of Single RNA Transcripts in Situ", Science, vol. 280, 1998, 585-590.
Feng, G. et al., "Imaging neuronal subsets in transgenic mice expressing multiple spectral variants of GFP", Neuron, 28, 2000, 41-51.
Filonov, G. S. et al., "Bright and stable near-infrared fluorescent protein for in vivo imaging", Nat. Biotechnol., 29, 2011, 757-61.
Fouz, M. et al., "Bright Fluorescent Nanotags from Bottlebrush Polymers with DNA-Tipped Bristles", ACS Central Science, vol. 1, 2015, 431-438.
Freifeld, L. et al., "Expansion microscopy of zebrafish for neuroscience and developmental biology studies", PNAS (online), Nov. 21, 2017, E10799-E10808.
Goedhardt, J. et al., "Structure-guided evolution of cyan fluorescent proteins towards a quantum yield of 93%", Nat. Commun., 3, 2012, 751.
Goor, Olga J. et al., "Introduction of anti-fouling coutings at the surface of supramolecular elastomeric materials via post-modification of reactive supramolecular additives", Polymer Chem., vol. 8, No. 34, Jan. 1, 2017, 5228-5238.
Griesbeck, O. et al., "Reducing the environmental sensitivity of yellow fluorescent protein. Mechanism and applications", J. Biol. Chem., 276, 2001, 29188-94.
Gurskaya, N. G. et al., "Engineering of a monomeric green-to-red photoactivatable fluorescent protein induced by blue light", Nat. Biotechnol., 24, 2006, 461-5.

(56) References Cited

OTHER PUBLICATIONS

Gyorvary, E. S. et al., "Self-Assembly and Recrystallization of Bacterial S-Layer Proteins at Silicon Supports Imaged in Real Time by Atomic Force Microscopy", Journal of Microscopy, vol. 212, 2003, 300-306.

Habuchi, S. et al., "mKikGR, a monomeric photoswitchable fluorescent protein", PLoS One, 3, 2008, e3944.

Hackstadt, T., "Steric hindrance of antibody binding to surface proteins of Coxiella burnetti by phase I lipopolysaccharide", Infect Immun, 56, 1998, 802-807.

Heim, R. et al., "Engineering green fluorescent protein for improved brightness, longer wavelengths and fluorescence resonance energy transfer", Curr. Biol., 6, 1996, 178-82.

Heim, R. et al., "Wavelength mutations and posttranslational autoxidation of green fluorescent protein", Proc. Natl. Acad. Sci. U.S.A., 91, 1994, 12501-4.

Hoffman, T. L. et al., "A Biosensor Assay for Studying Ligand-Membrane Receptor Interactions: Binding of Antibodies and HIV-1 Env to Chemokine Receptors", PNAS, 97(21), 2000, 11215-11220.

Huang, B. et al., "Whole-cell 3D Storm reveals interactions between cellular structures with nanometer-scale resolution", Nat. Methods, 5, 2008, 1047-1052.

Huisken, J. et al., "Optical Sectioning Deep Inside Live Embryos by Selective Plane Illumination Microscopy", Science. vol. 305, 2004, 1007-1009.

Hunt, et al., "High temperature antigen retrieval and loss of nuclear morphology: a comparison of microwave\rand autoclave techniques", J. Clin. Pathol. 49, 1996, 767-770.

Jekel, P A. et al., "Use of endoproteinase Lys-C from Lysobacter enzymogenes in protein sequence analysis", Anal. Biochem., 134, 1983, 347-354.

Jiang, Y. et al., "Click hydrogels, microgels and nanogels: emerging platforms for drug delivery and tissue engineering", Biomaterials, vol. 35, No. 18, Jun. 1, 2014, 4969-4985.

Jimenez, N. et al., "A Novel Approach for Intracellular 3D Immuno-Labeling for Electron Tomography", Traffic, 13, 2012, 926-933.

Jung, H. et al., "Axonal mRNA localization and local protein synthesis in nervous system assembly, maintenance and repair", Nat. Rev. Neurosci., vol. 13(5), 2012, 308-24.

Kakimoto, K. et al., "Hypothesis for the mechanism for heat-induced antigen retrieval occurring on fresh frozen sections without formalin-fixation in immunohistochemistry", J Mol Histol., 39, 2008, 389-399.

Kaur, et al., Biochemistry 45, 2006, 7347-7355.

Ke, R. et al., "In situ sequencing for RNA analysis in preserved tissue and cells", Nature Methods, vol. 10(9), 2013, 857-60.

Ke, Rongqin et al., "Supplementary Material In situ sequencing for RNA analysis in preserved tissue and cells", Nature Methods 10(9):857-60, 2013, 1-29.

Kroon, D.-J , "B-spline Grid, Image and Point based Registration", Matlab Cent. at <http://www.mathworks.com/matlabcentral/fileexchange/20057-b-spline-grid--image-and-point-based-registration>.

Laemmli, U. K., "Cleavage of structural proteins during the assembly of the head of bacteriophage T4", Nature, 227, 1970, 680-685.

Lam, A. J. et al., "Improving FRET dynamic range with bright green and red fluorescent proteins", Nat. Methods, 9, 2012, 1005-12.

Lee, J. H. et al., "Highly Multiplexed Subcellular RNA Sequencing in Situ", Sciencexpress, online http://www.sciencemag.org/content/early/recent, 6 pages (Science, vol. 343), This May Be the Same as Lee (FIP Ref No. 304851), Feb. 27, 2014.

Lein, E. et al., "Genome-wide atlas of gene expression in the adult mouse brain", Nature, vol. 445, 2007, 168-76.

Levsky, J. et al., "Fluorescence in situ hybridization: past, present and future", Journal of Cell Science, 116, 2003, 2833-2838.

Lieberman-Aiden, E. et al., "Comprehensive mapping of long-range interactions reveals folding principles of the human genome", Science 326, 2009, 289-93.

Livet, J. et al., "Transgenic strategies for combinatorial expression of fluorescent proteins in the nervous system", Nature, 450, 2007, 56-62.

Lowe, D. G., "Distinctive Image Features from Scale-Invariant Keypoints", Int. J. Comput. Vis., 60, 2004, 91-110.

Lubeck, E. et al., "Single-cell in situ RNA profiling by sequential hybridization", Nature Methods, vol. 11(4), 2014, 360-1.

Lubeck, E. et al., "Single-cell systems biology by super-resolution imaging and combinatorial labeling", Nature Methods, vol. 9, 2012, 743-8.

Majcher, M. J. et al., "Hydrogel synthesis and design", In: "Cellulose-Based Superabsorbent Hydrogels", Springer International Publishing, Jan. 1, 2018, 1-41.

Markwardt, M. L. et al., "An improved cerulean fluorescent protein with enhanced brightness and reduced reversible photoswitching", PLoS One, 6, 2011, e17896.

McKinney, S. A. et al., "A bright and photostable photoconvertible fluorescent protein", Nat. Methods, 6, 2009, 131-3.

Mito, M. et al., "Simultaneous multicolor detection of RNA and proteins using super-resolution microscopy", Methods, doi:10.1016/j.ymeth.2015.11.007., 2015.

Mortensen, K. I. et al., "Optimized localization analysis for singlemolecule tracking and super-resolution microscopy", Nat. Methods, 7, 2010, 377-81.

Nagai, T. et al., "A variant of yellow fluorescent protein with fast and efficient maturation for cell-biological applications", Nat. Biotechnol., 20, 2002, 87-90.

Nagre, R. D. et al., "Thermosaline Resistant Acrylamide-Based Polyelectrolyte as Filtration Control Additive in Aqueous-Based Mud", Petroleum and Coal, vol. 56, No. 3, 2014, 222-230.

Nilsson, M. et al., "RNA-templated DNA ligation for transcript ananlysis", Nucleic Acids Research, Information Retrieval LTD., vol. 29, No. 2, Jan. 15, 2001, 578-581.

Orakdogen, N. et al., "Correlation Between Crosslinking Efficiency and Spatial Inhomogeneity in Poly(acrylamide) Hydrogels", Polymer Bulletin, vol. 57, 2006, 631-641.

Ormo, M. et al., "Crystal structure of the Aequorea victoria green fluorescent protein", Science, 273, 1996, 1392-5.

Oshima, K. et al., "Model Polyelectrolyte Gels Synthesized by End-Linking of Tetra-Arm Polymers with Click Chemistry: Synthesis and Mechanical Properties", Macromolecules, vol. 47, 2014, 7573-7580.

Panning, B. et al., "X chromosome Inactivation is Mediated by by Xist RNA stabilization", Cell. vol. 90, 1997, 907-16.

Park, Y. N. et al., "Detection of Hepatitis C Virus RNA Using Ligation-Dependent Polymerase Chain Reaction in Formalin-Fixed, Paraffin-Embedded Liver Tissues", Amer. J. of Pathol., vol. 149, No. 5, Nov. 1, 1996, 1485-1491.

Plath, K. et al., "Xist RNA and the mechanism of X chromosome inactivation", Annu. Rev. Genet. 36, 2002, 233-78.

Pum, D. et al., "Reassembly of S-Layer Proteins", Nanotechnology, 2014, 1-15.

Raj, A. et al., "Detection of individual endogenous RNA transcripts in situ using multiple singly labeled probes", Methods in Enzymology, vol. 472 (Elsevier Inc.), 2010, 365-386.

Raj, A. et al., "Imaging individual mRNA molecules using multiple singly labeled probes", Nat. Methods 5(10), 2008, 877-879.

Randall, K. J. et al., "A dual-label technique for the immunohistochemical demonstration of T-lymphocyte subsets in formalin-fixed, paraffin-embedded rat lymphoid tissue", Toxicol. Pathol., 36, 2008, 795-804.

Rego, E. H. et al., "Nonlinear structured-illumination microscopy with a photoswitchable protein reveals cellular structures at 50-nm resolution", Proc. Natl. Acad. Sci. U.S.A., 109, 2012, E135-43.

Reinhart-King, C. A. et al., "Dynamics and Mechanics of EndothelialCell Spreading", Biophysical J, 89(1):, Jul. 1, 2005, 676-689.

Rose, R. et al., "Ocular ascorbate transport and metabolism", A. Comp. Physiol., 100, 1991, 273-85.

Rothbauer, M. et al., "Exploitation of S-Layer Anisotropy: pH-Dependent Nanolayer Orientation for Cellular Micropatterning,", Acs NANO, published online, 2013.

(56) References Cited

OTHER PUBLICATIONS

Sakai, T. et al., "Design and Fabrication of a High-Strength Hydrogel with Ideally Homogenous Network Structure from Tetrahedron-Like Macromonomers", Macromolecules, vol. 41, 2008, 5379-5384.
Schindelin, J. et al., "Fiji: an open-source platform for biological-image analysis", Nature Methods, vol. 9, 2012, 676-82.
Schnell, U. et al., "Immunolabeling artifacts and the need for live-cell imaging", Nat. Methods, 9, 2012, 152-158.
Seneviratne, U. et al., "S-nitrosation of proteins relevant to Alzheimer's disease during early stages of neurodegeneration", Proc. Natl. Acad. Sci. U. S. A. 1521318113—(2016). doi:10.1073/pnas.1521318113.
Shah, S. et al., "Single-molecule RNA detection at depth via hybridization chain reaction and tissue hydrogel embedding and clearing", Development In Review, 2016.
Shaner, N. C. et al., "Improved monomeric red, orange and yellow fluorescent proteins derived from *Discosoma* sp. red fluorescent protein", Nat. Biotechnol., 22, 2004, 1567-72.
Shaner, N. C. et al., "Improving the photostability of bright monomeric orange and red fluorescent proteins", Nat. Methods, 5, 2008, 545-51.
Shcherbakova, D. M. , "An orange fluorescent protein with a large Stokes shift for single-excitation multicolor FCCS and FRET imaging", J. Am. Chem. Soc., 134, 2012, 7913-23.
Shcherbo, D. et al., "Far-red fluorescent tags for protein imaging in living tissues", Biochem. J., 418, 2009, 567-74.
Sleytr, U. et al., "Heterologous Reattachment of Regular Arrays of Glycoproteins on Bacterial Surfaces", Nature, vol. 257, 1975, 400-401.
Sleytr, U. et al., "S-Layers Principles and Applications", FEMS Microbiology Rev., 2014, 1-42.
Sniegowski, J. A. et al., "Maturation efficiency, trypsin sensitivity, and optical properties of Arg96, Glu222, and Gly67 variants of green fluorescent protein", Biochem. Biophys. Res. Commun., 332, 2005, 657-63.
Steward, O. et al., "Compartmentalized synthesis and degradation of proteins in neurons", Neuron, vol. 40, 2003, 347-359.
Steward, O. et al., "Synaptic activation causes the mRNA for the leg Arc to localize selectively near activated postsynaptic sites on dendrites", Neuron, vol. 21, 1998, 741-751.
Strack, R. , "Imaging Bigger is Better for Super-Resolution", Nature Methods, 12(13), Mar. 1, 2015, 169.
Subach, F. V. et al., "Bright monomeric photoactivatable red fluorescent protein for two-color super-resolution sptPALM of live cells", J. Am. Chem. Soc., 132, 2010, 6481-91.
Subach, O. M. et al., "An Enhanced Monomeric Blue Fluorescent Protein with the High Chemical Stability of the Chromophore", PLoS One, 6, 2011, e28674.
Thevenaz, P. et al., "A pyramid approach to subpixel registration based on intensity". IEEE Trans. Image Process., 7, 1998, 27-41.
Tillberg, P. et al., "Protein-Retention Expansion Microscopy of Cells and Tissues Labeled Using Standard Fluorescent Proteins and Antibodies", Nature Biotechnology vol. 34(9), 2016, 987-995.
Van Vliet, et al., "The Biomechanics Toolbox: Experimental Approaches for Living Cells and Biomolecules", Acta Materialia, 51, Aug. 23, 2003, 5881-5905.
Vedaldi, A. et al., Vlfeat. in Proc. Int. Conf. Multimed.—MM '10 1469 (ACM Press, 2010). doi: 10.1145/1873951.1874249.
Wachter, R. M. et al., "Sensitivity of the yellow variant of green fluorescent protein to halides and nitrate", Curr. Biol., 9, 1999, R628-R629.
Wang, F. et al., "RNAscope: A novel in situ RNA analysis platform for formalin-fixed, paraffin-embedded tissues, Journal of Molecular Diagnostics," vol. 14(1), 2012, 22-29.
Wu, C. C. et al., "A method for the comprehensive proteomic analysis of membrane proteins", Nat. Biotechnol., 21, 2003, 532-8.
Xingqi, C. et al., "ATAC-see reveals the accessible genome by transposase-mediated HJ, imaging and sequencing", Nature Methods, vol. 13, No. 12, Dec. 1, 2016, 1013-1020.
Xu, J. et al., "Bioorthogonally cross-linked hydrogel network with precisely controlled disintegration time over a broad ragne", J. Am. Chem.Soc., vol. 136, No. 11, Mar. 19, 2014, 4105-4108.
Yazici, I. et al., "Spatial Inhomogeneity in Poly(acrylic acid) Hydrogels", Polymer, vol. 46, 2005, 2595-2602.
Zhang, D. et al., "Dynamic DNA nanotechnology using strand-displacement reactions", Nature Chemistry, vol. 3, 2011, 103-113.
Zhang, R. et al., "Tools for GPCR Drug Discovery", Acta Pharmacologica Sinica, 33, 2012, 372-384.
Zhou, C. et al., "Synthesis and characterization of well-defined PAA-PEG multi-responsive hydrogels by ATRP and click chemistry", RSC ADV., vol. 4, No. 97, Jan. 1, 2014, 54631-54640.
Zimmerman, T. A. et al., "Adapting the stretched sample method from tissue profiling to imaging", Proteomics, 8, 2008, 3809-3815.
Boutin, J. A. "Myristoylation." Cell. Signal, 9(1):15-35. (Jan. 1997) doi:10.1016/S0898-6568(96)00100-3.
Bullock, G. R. "The current status of fixation for electron microscopy: A review." J. Microsc., 133: 1-15. (1984). doi:10.1111/j.1365-2818.1984.tb00458.x.
Chen, X. et al. [Supplementary material] "AT AC-see reveals the accessible genome by transposase-mediated imaging and sequencing," Nature Methods, vol. 13, No. 12, Oct. 17, 2016, 1813-1828.
Cochilla, A. J. et al. "Monitoring secretory membrane with FM1-43 flourescence." Annu, Rev, Neurosci. 22:1-10 (1999). doi:10.1146/annurev.neuro.22.1.1.
Danilczyk, U. G., et al. "Functional relationship between calreticulin, calnexin, and the endoplasmic reticulum luminal domain of calnexin." J. Biol. Chem. 275(17): 13089-13097 (2000). doi: 10.1074/jbc.275.17.13089.
Duan, C. et al., "Application of antigen retrieval method in hMAM immunohistochemical staining of old paraffin-embedded specimens," Academy of Military Medical Sciences, vol. 38(12), Dec. 31, 2014, 965-967.
English, A. R. et al. "Endoplasmic reticulum structure and interconnections with other organelles." Cold Spring Harbor Perspectives in Biology 2013:5:a013227. doi:10.1101/cshperspect.a013227.
Guo A. et al. "The Critical Role of Surface Chemistry In Protein Microarrays" in Functional Protein Microarrays in Drug Discovery, edt. Paul Predki, p. 53-71 (CRC press, Boca Raton, 2007).
Guo, H. et al. "An efficient procedure for protein extraction from formalin-fixed, Paraffin-embedded tissues for reverse phase protein arrays." Proteome Sci. 10:56 (2012). doi:10.1186/1477-5956-10-56.
Honig, M. G. et al. "DiI and DiO: versatile fluorescent dyes for neuronal labeling and pathway tracing." Trends Neurosci. 12(9):333-341 (1989). doi:10.1016/0166-2236(89)90040-4.
Honig, M. G. et al. "Fluorescent carbocyanine dyes allow living neurons of identified origin to be studied in long-term cultures." J. Cell Biol. 103:171-187 (1986). doi: 10.1083/jcb. 103.1.171.
International Search Report and Written Opinion from the International Searching Authority dated Apr. 28. 2020 from corresponding International Patent Application No. PCT/US2020/018789 Filed on Feb. 19, 2020.
Jamur, M. C. et al. "Permeabilization of Cell Membranes." in Immunocytochemical Methods and Protocols 588:63-6 (2010). doi:10.1007/978-1-59745-324-0 9.
Ku, T. et al. "Multiplexed and scalable super-resolution imaging of three-dimensional protein localization in size-adjustable tissues." Nat. Biotechnol. 34(9): 973-981 (2016). doi:10.1038/nbt 3641.
Lakkaraju, A. K. K. et al. "Palmitoylated calnexin is a key component of the ribosome-translocon complex." EMBO J. 31, 1823-1835 (2012). doi:10.1038/emboj.2012.15.
Linder, M. E. et al. "Palmitoylation: Policing protein stability and traffic." Nature Reviews Molecular Cell Biology 8:74-84 (2007). doi:10.1038/nr2084.
Mabrey, S. et al. "Investigation of phase transitions of lipids and lipid mixtures by sensitivity differential scanning calorimetry." Proc. Natl. Acad. Sci. 73(11): 3862-3866 (1976). doi:10.1073/pnas.73.11.3862.
Menon, A. K. "Lipid modifications of proteins." in 'Biochemistry of Lipids, Lipoproteins and Membranes' 39-58 (2008). doi: 10.1016/8978-044453219-0.50004-0.

(56) References Cited

OTHER PUBLICATIONS

Myhill, N. et al. "The subcellular distribution of calnexin is mediated by PACS-2." Mol, Biol. Cell 19:2777-2788 (2008). doi: 10.1091/mbc.E07-10-0995.
Revelo, N. H. et al. "A new probe for super-resolution imaging of membranes elucidates trafficking pathways." J. Cell Biol. 205(4):591-606 (2014). doi:10.1083/jcb.201402066.
Sarrazin, S. et al. "Heparan sulfate proteoglycans." Cold Spring Harb. Perspect. Biol. 2011;3:a004952. doi: 10.1101/cshperspect. a004952.
Scicchitano, M. S., et al. "Protein extraction of formalin-fixed, paraffin-embedded tissue enables robust proteomic profiles by mass spectrometry." J. Histochem. Cytochem. 57(9): 849-860 (2009). doi:10.1369/jhc.2009.953497.
Seifert U. "Configurations of fluid membranes and vesicles." Adv. Phys. 46(1):13-137 (1997). doi:10.1080/00018739700101488.
Shen, K., et al. "Comparison of different buffers for protein extraction from formalin-fixed and paraffin-embedded tissue specimens." PLoS One 10(11): e0142650 (2015). doi:10.1371/journal.pone. 0142650.
Shi, S. R., et al. "Antigen retrieval in formalin-fixed, paraffin-embedded tissues: An enhancement method for immunohistochemical staining based on microwave oven heating of tissue sections." J. Histochem. Cytochem. 39 (6):741-8 (1991) doi: 10.1177/39.6. 1709656.
Tanca, A. et al. "Comparability of differential proteomics data generated from paired archival fresh-frozen and formalin-fixed samples by GeLC-MS/MS and spectral counting." J. Proteomics 77:561-576 (2012). doi:10.1016/j.jprot.2012.09.033.
Tanca, A. et al. "Critical comparison of sample preparation strategies for shotgun proteomic analysis of formalin-fixed, paraffin-embedded samples: Insights from liver tissue." Clin. Proteomics 11:28 (2014). doi:10.1186/1559-0275-11-28.
Testagrossa et al. "Immunohistochemical expression of podocyte markers in the variants of focal segmental glomerulosclerosis." National Dial Transplant 28: 91-98 (2013).
ThermoFisher Scientific, Epitope Recovery Methods for IHC, Nov. 7, 2015, pp. 1-2.
Valenzuela, J. I. et al. "Diversifying the secretory routes in neurons." Frontiers in Neuroscience 9:358 (2015). doi:10.3389/fnins. 2015.00358.
Van Meer, G., et al. "Membrane lipids: Where they are and how they behave." Nature Reviews Molecular Cell Biology 9(2): 112-124 (2008). doi:10.1038/nrm2330.
Wassie, A. T., et al. "Expansion microscopy: principles and uses in biological research." Nature Methods 16(1): 33-41 (2019). doi:10. 1038/s41592-018-0219-4.
Weber, P. C., et al. "Structural origins of high-affinity biotin binding to streptavidin." Science 243(4887):85-88 (1989). doi:10.1126/ science.2911722.
Wen, G. et al. "Evaluation of direct grafting strategies in Expansion Microscopy." BioRxiv preprint July 8. 2019. doi: https://doi.org/ 10.1101/696039 (Jul. 8, 2019).
Wurm, C. A. et al. "Nanoscale distribution of mitochondrial import receptor Tom20 is adjusted to cellular conditions and exhibits an inner-cellular gradient." Proc. Natl. Acad. Sci. U. S. A. 108(33):13546-13551 (2011). doi:10.1073/pnas.1107553108.
Yan, B. X. et al. "Glycine residues provide flexibility for enzyme active sites." J. Biol. Chem. 272(6): 3190-4 (1997). doi:10.1074/ jbc.272.6.3190.
Zhao, Y. et al. "Nanoscale imaging of clinical specimens using pathology-optimized expansion microscopy." Nat. Biotechnol. 35(8): 757-764 (2017). doi:10.1038/nbt.3892.
Zuiderveld, K. "Contrast Limited Adaptive Histogram Equalization." in Graphics Gems 474-485 (1994). doi:10.1016/b978-0-12-336156-1.50061-6.
Ferri A. (2020). Expansion Microscopy: A New Approach to Microscopic Evaluation. (Master's thesis). Retrieved from https:// scholarcommons.sc.edu/etd/6034 (Year: 2020).

Extended European Search Report and search opinion from the European Patent Office dated Oct. 23, 2022 from corresponding International Patent Application PCT/US2020 018789 Filed on Feb. 19, 2020.
Caprette, "Experimental Biosciences: Resources for Introductory & Intermediate level laboratory courses" (2012), available online at https://www.ruf.rice.edu/~bioslabs/studies/sds-page/denature.html (Year: 2012).
Cho et al., "Expansion Microscopy" (2018), Journal of Microscopy, vol. 271, Issue 2: 123-128. (Year: 2018).
Alon, S. et al. Expansion sequencing: Spatially precise in situ transcriptomics in intact biological systems. Science 371, 481-+, doi:10.1126/science.aax2656 (2021).
Cahoon, C. K. et al. Superresolution expansion microscopy reveals the three-dimensional organization of the *Drosophila synaptonemal* complex. Proc Natl Acad Sci U S A 114, E6857-E6866, doi:10. 1073/pnas.1705623114 (2017).
Campbell, K. R. et al. clonealign: statistical integration of independent single-cell RNA and DNA sequencing data from human cancers. Genome Biol 20, 54, doi:10.1186/s13059-019-1645-z (2019).
Chen, G. et al. Reactivity of functional groups on the protein surface: development of epoxide probes for protein labeling. J Am Chem Soc 125, 8130-8133, doi:10.1021/ja034287m (2003).
Cirillo, L. et al. UBAP2L forms distinct cores that act in nucleating stress granules upstream of G3BP1. Curr Biol 30, 698-707 e696, doi:10.1016/j.cub.2019.12.020 (2020).
Cote, A. et al. The spatial distributions of pre-mRNAs suggest post-transcriptional splicing of specific introns within endogenous genes. bioRxiv, doi:10.1101/2020.04.06.028092 (2020).
Cui, Y. et al. Fluctuation localization imaging-based fluorescence in situ hybridization (fliFISH) for accurate detection and counting of RNA copies in single cells. Nucleic Acids Res 46, e7, doi:10.1093/ nar/gkx874 (2018).
Cui, Y. et al. Quantitative mapping of oxidative stress response to lithium cobalt oxide nanoparticles in single cells using multiplexed in situ gene expression analysis. Nano Lett 19, 1990-1997, doi:10. 1021/acs.nanolett.8b05172 (2019).
Decarreau, J. et al. Corrigendum: The tetrameric kinesin Kif25 suppresses pre-mitotic centrosome separation to establish proper spindle orientation. Nat Cell Biol 19, 740, doi:10.1038/ncb3546 (2017).
Decarreau, J. et al. The tetrameric kinesin Kif25 suppresses pre-mitotic centrosome separation to establish proper spindle orientation. Nat Cell Biol 19, 384-390, doi:10.1038/ncb3486 (2017).
Eirew, P. et al. Dynamics of genomic clones in breast cancer patient xenografts at single-cell resolution. Nature 518, 422-426, doi:10. 1038/nature13952 (2015).
Falahati, H. et al., Thermodynamically driven assemblies and liquid-liquid phase separations in biology. Soft Matter 15, 1135-1154, doi:10.1039/c8sm02285b (2019).
Fecher, C. et al. Cell-type-specific profiling of brain mitochondria reveals functional and molecular diversity. Nat Neurosci 22(10), 1731-1742 doi:10.1038/s41593-019-0479-z (2019).
Gambarotto, D. et al. Imaging cellular ultrastructures using expansion microscopy (U-ExM). Nat Methods 16, 71-74, doi: 10.1038/ s41592-018-0238-1 (2019).
Gao, M. et al. Expansion stimulated emission depletion microscopy (ExSTED). ACS Nano 12, 4178-4185, doi:10.1021/acsnano. 8b00776 (2018).
Gao, R. et al. A highly homogeneous polymer composed of tetrahedron-like monomers for high-isotropy expansion microscopy. Nat Nanotechnol 16, 698-707, doi: 10.1038/s41565-021-00875-7 (2021).
Gao, R. et al. Cortical col. and whole-brain imaging with molecular contrast and nanoscale resolution. Science 363 (6424), doi:10.1126/ science.aau8302 (2019).
Hafner, A. S. et al., Local protein synthesis is a ubiquitous feature of neuronal pre-and postsynaptic compartments. Science 364, doi:10. 1126/science.aau3644 (2019).
Halpern, A. R. et al., Hybrid structured illumination expansion microscopy reveals microbial cytoskeleton organization. ACS Nano 11, 12677-12686, doi:10.1021/acsnano.7b07200 (2017).
Hansen, M., Lee, S. J., Cassady, J. M. & Hurley, L. H. Molecular details of the structure of a psorospermin-DNA covalent/

(56) References Cited

OTHER PUBLICATIONS intercalation complex and associated DNA sequence selectivity. J Am Chem Soc 118, 5553-5561 (1996).
He, J. et al. Prevalent presence of periodic actin-spectrin-based membrane skeleton in a broad range of neuronal cell types and animal species. Proc Natl Acad Sci U S A 113, 6029-6034, doi:10.1073/pnas.1605707113 (2016).
Invitrogen Corporation, "Proteinase K (solution), RNA Grade", Cat. No. 25530-049, rev. date: Aug. 25, 2008, 2 pages, accessed from https://www.thermofisher.com/document-connect/document-connect.html?url=https://assets.thermofisher.com/TFS-Assets%2FLSG%2Fmanuals%2Fproteinasek_solution_man.pdf (2008).
Kao, P. et al., Transcriptional activation of *Arabidopsis* zygotes is required for initial cell divisions. Sci Rep 9, 17159, doi:10.1038/s41598-019-53704-2 (2019).
Karagiannis, E. D. et al. Expansion microscopy of lipid membranes. bioRxiv, 829903, doi:10.1101/829903 (2019).
Keenan et al., "An automated machine vision system for the histological grading of cervical intraepithelial neoplasia (CIN)," Journal of Pathology, J Pathol 2000; 192: pp. 351-362.
Koppers, M. et al. Receptor-specific interactome as a hub for rapid cue-induced selective translation in axons. Elife 8, 1-27 doi:10.7554/eLife.48718 (2019).
Kumar, A. et al. Influenza virus exploits tunneling nanotubes for cell-to-cell spread. Sci Rep 7, 1-14, 40360, doi:10.1038/srep40360 (2017).
Kunz, T. C. et al., Using Expansion Microscopy to Visualize and Characterize the Morphology of Mitochondrial Cristae. Front Cell Dev Biol 8, 617, doi:10.3389/fcell.2020.00617 (2020).
Li, R. et al. Expansion enhanced nanoscopy. Nanoscale 10, 17552-17556, doi:10.1039/c8nr04267e (2018).
Lim, Y. et al. Mechanically resolved imaging of bacteria using expansion microscopy. PLoS Biol 17, e3000268, doi:10.1371/journal.pbio.3000268 (2019).
Martinez, G. F. et al. Quantitative expansion microscopy for the characterization of the spectrin periodic skeleton of axons using fluorescence microscopy. Sci Rep 10, 2917, doi:10.1038/s41598-020-59856-w (2020).
Mosca, T. J. et al., Presynaptic LRP4 promotes synapse number and function of excitatory CNS neurons. Elife 6, doi:10.7554/eLife.27347 (2017).
M'Saad, O. et al., Light microscopy of proteins in their ultrastructural context. Nat Commun 11, 3850, doi:10.1038/s41467-020-17523-8 (2020).
Park, Y. G. et al. Protection of tissue physicochemical properties using polyfunctional crosslinkers. Nat Biotechnol 37, 73-83, doi:10.1038/nbt.4281 (2019).
Richter, S. et al. Clerocidin alkylates DNA through its epoxide function: evidence for a fine tuned mechanism of action. Nucleic Acids Res 31, 5149-5156, doi:10.1093/nar/gkg696 (2003).
Sahl, S. J. et al., Fluorescence nanoscopy in cell biology. Nat Rev Mol Cell Biol 18(11), 685-701, doi:10.1038/nrm.2017.71 (2017).
Sarkar, D. et al. Expansion revealing: decrowding proteins to unmask invisible brain nanostructures. bioRxiv, doi:10.1101/2020.08.29.273540 (2020).
Shen, F. Y. et al. Light microscopy based approach for mapping connectivity with molecular specificity. Nat Commun 11, 4632, doi:10.1038/s41467-020-18422-8 (2020).
Shurer, C. R. et al. Physical principles of membrane shape regulation by the glycocalyx. Cell 177, 1757-1770 e1721, doi:10.1016/j.cell.2019.04.017 (2019).
Sidenstein, S. C. et al. Multicolour multilevel STED nanoscopy of actin/spectrin organization at synapses. Sci Rep 6, 26725, doi:10.1038/srep26725 (2016).
So, C. et al. A liquid-like spindle domain promotes acentrosomal spindle assembly in mammalian oocytes. Science 364, doi:10.1126/science.aat9557 (2019).
Suofu, Y. et al. Dual role of mitochondria in producing melatonin and driving GPCR signaling to block cytochrome c release. Proc Natl Acad Sci U S A 114, E7997-E8006, doi:10.1073/pnas.1705768114 (2017).
Thevathasan, J. V. et al. Nuclear pores as versatile reference standards for quantitative superresolution microscopy. Nat Methods 16, 1045-1053, doi:10.1038/s41592-019-0574-9 (2019).
Tillberg, P. W. et al. Expansion microscopy: scalable and convenient super-resolution microscopy. Annu Rev Cell Dev Biol 35, 683-701, doi:10.1146/annurev-cellbio-100818-125320 (2019).
Truckenbrodt et al., A practical guide to optimization in X10 expansion microscopy. Nat Protoc 14, 832-863, doi:10.1038/s41596-018-0117-3 (2019).
Valdes, P. A. et al. Decrowding expansion pathology: unmasking previously invisible nanostructures and cells in intact human brain pathology specimens. bioRxiv, doi:10.1101/2021.12.05.471271 (2021).
Wang, G. et al., Multiplexed imaging of high-density libraries of RNAs with MERFISH and expansion microscopy. Sci Rep 8(4847), 1-13 doi:10.1038/s41598-018-22297-7 (2018).
Wang, Y. et al. EASI-FISH for thick tissue defines lateral hypothalamus spatio-molecular organization. Cell 184, 6361-6377 e6324, doi:10.1016/j.cell.2021.11.024 (2021).
Xu, H. et al. Molecular organization of mammalian meiotic chromosome axis revealed by expansion STORM microscopy. Proc Natl Acad Sci U S A 116, 18423-18428, doi:10.1073/pnas.1902440116 (2019).
Xu, K. et al., Actin, spectrin, and associated proteins form a periodic cytoskeletal structure in axons. Science 339, 452-456, doi:10.1126/science.1232251 (2013).
Abcam, "IHC-Paraffin Protocol (IHC-P)", 13 pages, published: Jun. 15, 1999, online webpage: www.abcam.com/ps/pdf/protocols/ihc_p.pdf. (Year: 1999).
Abbasi et al., Palmitic Acid-Modified Poly-L-Lysine for Non-Viral Delivery of Plasmid DNA to Skin Fibroblasts, 2007, Biomacromolecules 2007, 8, 1059-1063 (Year: 2007).
Ahearn et al., Posttranslational Modifications of RAS Proteins, Cold Spring Harb Perspect Med 2018;8:a031484 (Year: 2018).
Bensimon, A. et al., "Alignment and Sensitive Detection of DNA by a Moving Interface." Alignment and Sensitive Detection of DNA by a Moving Interface.
Cheeseman, Kevin, et al. "A Diagnostic Genetic Test for the Physical Mapping of Germline Rearrangements of the Susceptibility Breast Cancer Genes BRCA1 and BRCA2." Human Mutation, vol. 33, No. 6, 998-1009, 2012.
Diggle Ma et al., A novel method for preparing single-stranded DNA for pyrosequencing, 2003, Molecular Biotechnology, 24(2):221-224.
Dong, Huimin et al. "Preparation of photodeformable azobenzene polymer fibers by post-crosslinking strategy: Understanding the structure-property relationship", European Polymer Journal, Pergamon Pressltd Oxford, GB, vol. 135, Jul. 10, 2020 (Jul. 10, 2020), XP086224455, ISSN: 0014-3057, DOI:10.1016/J.EURPOLYMJ.2020.109863.
Gad, Sophie, et al. "Identification of a large rearrangement of the BRCA1 gene using colour bar code on combed DNA in an American breast/ovarian cancer family previously studied by direct sequencing." F. Med Genet 2001, 38:388-392.
Guan et al., Understanding Protein Palmitoylation: Biological Significance and Enzymology, 2011, Sci China Chem. Dec. 2011; 54(12): 1888-1897 (Year: 2011).
Hamano et al., ε-Poly-L-Lysine Peptide Chain Length Regulated by the Linkers Connecting the Transmembrane Domains of £-Poly-L-Lysine Synthetase, Aug. 2014, Applied and Environmental Microbiology, vol. 80 Number 16, p. 4993-5000 (Year: 2014).
Hodson, Robert E et al. "In Situ PCR for Visualization of Microscale Distribution of Specific Genes and Gene Products in Prokaryotic Communities." Applied and Environmental Microbiology, Nov. 1995, p. 4074-4082.
Jain, Miten et al. "Nanopore sequencing and assembly of a human genome with ultra-long reads." Nature Biotechnology, vol. 36, No. 4, Apr. 2018.
Kaykov, A., et al. "Molecular Combing of Single DNA Molecules on the 10 Megabase Scale." Sci. Rep. 6, 19636, 2016, p. 1-9.

(56) References Cited

OTHER PUBLICATIONS

Kleuss et al., Galphas is palmitoylated at the N-terminal glycine, The EMBO Journal vol. 22 No. 4 pp. 826-832, 2003 (Year: 2003).
Kondo, N. et al. "DNA Damage Induced by Alkylating Agents and Repair Pathways." Journal of Nucleic Acids, vol. 2010, Article ID 543531, 7 pages.
Larsson, Chatarina et al. "In situ genotyping individual DNA molecules by target-primed rolling-circle amplification of padlock probes." Nature Methods, vol. 1, No. 3, Dec. 2004.
Lunzer, Markus et al. "A Modular Approach to Sensitized Two-Photon Patterning of Photodegradable Hydrogels", Angewandte Chemie, Wiley—V CH Verlaggmbh & Co. KGAA, DE, vol. 130, No. 46, (Oct. 18, 2018), pp. 15342-15347, XP071375228, ISSN: 0044-8249, DOI:10.1002/ANGE.201808908.
Marie, R., et al. "Concentrating and labeling genomic DNA in a nanofluidic array." Nanoscale. 10 (2018), pp. 1376-1382.
Maxam, A. M., and Gilbert W., "A new method for sequencing DNA." Proc. Natl. Acad. Sci. U.S.A., 74, 560-564, 1977.
Nyren, Pal, et al. "Solid Phase DNA Minisequencing by an Enzymatic Luminometric Inorganic Pyrophosphate Detection Assay." Analytical Biochemistry 208, 171-175 (1993).
Rapp, Teresa L. et al. "Visible Light-Responsive Dynamic Biomaterials: Going Deeper and Triggering More", Advanced Healthcare Materials, Wiley—V CH Verlag GmbH & Co. KGAA, DE, vol. 9, No. 7, Feb. 25, 2020, page n/a, XP072463096, ISSN: 2192-2640, DOI:10.1002/ADHM.201901553.
Salaun et al., The intracellular dynamic of protein palmitoylation, 2010, J. Cell Biol. Vol. 191 No. 7 1229-1238 (Year: 2010).
Schirmer, M., et al. "Insight into biases and sequencing errors for amplicon sequencing with the Illumina MiSeq platform." Nucleic Acids Research, vol. 43, Issue 6, Mar. 31, 2015, e37, pp. 1-16.
Schonhuber, Wilhelm, et al. "Improved Sensitivity of Whole-Cell Hybridization by the Combination of Horseradish Peroxidase-Labeled Oligonucleotides and Tyramide Signal Amplification." Applied and Environmental Microbiology, Aug. 1997, p. 3268-3273.
Shendure, J., et al. "DNA sequencing at 40: past, present, and future." Nature 2017, Oct. 19;550(7676): 345-353.
Sikdar, Partha et al. "Recent advances in the synthesis of smart hydrogels", Materials Advances, vol. 2, No. 14, Jan. 1, 2021, pp. 4532-4573, XP093067739,DOI: 10.1039/D1MA00193K.
Singh, Anirudha et al. "Photomodulation of Cellular Gene Expression in Hydrogels", ACS Macro Letters, vol. 2, No. 3, (Mar. 8, 2013), pp. 269-272, XP093109803, ISSN: 2161-1653, DOI: 10.1021/mz300591m.
Stankova, Helena, et al. "BioNano genome mapping of individual chromosomes supports physical mapping and sequence assembly in complex plant genomes." Plant Biotechnology Journal (2016) 14, pp. 1523-1531 doi: 10.1111/pbi. 12513.
Strick, T., et al. "Twisting and stretching single DNA molecules." Progress in Biophysics & Molecular Biology 74 (2000) 115-140.
Ueda H.R., et al. "Tissue clearing and its applications in neuroscience." Nature Reviews, Neuroscience, vol. 21, Feb. 2020.
Varapula et al., A micropatterned substrate for on-surface enzymatic labelling of linearized long DNA molecules, 2019, Scientific Reports, 9, 15059.
Wages JM, Polymerase Chain Reaction, 2005, Encyclopedia of Analytical Science, (2): 243-250.
Wang, X., et al., "Characterization of denaturation and renaturation of DNA for DNA hybridization." Environ. Health Toxicol, 29, e2014007, 2014.
Wen et al., Specific antibody immobilization with biotin-poly(L-lysine)-g-poly(ethylene glycol) and protein A on microfluidic chips, Journal of Immunological Methods 350 (2009) 97-105 (Year: 2009).
Yanagawa, Fumiki et al. "Activated-Ester-Type Photocleavable Crosslinker for Preparation of Photodegradable Hydrogels Using a Two-Component Mixing Reaction", Advanced Healthcare Materials, Wiley—V CH Verlag GmbH & Co. KGAA, DE, vol. 4, No. 2, (Aug. 13, 2014), pp. 246-254, XP072465709, ISSN: 2192-2640, DOI:10.1002/ADHM.201400180.
Akhmetzhan, A., et al. "A short review on the N, N-Dimethylacrylamide-based hydrogels." Gels 7.4 (2021): 234.
Cipriano, B.H., et al. "Superabsorbent hydrogels that are robust and highly stretchable." Macromolecules 47.13 (2014): 4445-4452.
Klimas, A., et al. "Magnify is a universal molecular anchoring strategy for expansion microscopy." Nature biotechnology 41.6 (2023): 858-869.
Rueda, J.C., et al. "Synthesis and characterization of stiff, self-crosslinked thermoresponsive DMAA hydrogels." Polymers 12.6 (2020): 1401.
Truckenbrodt, S., et al. "X10 expansion microscopy enables 25-nm resolution on conventional microscopes." EMBO reports 19.9 (2018): e45836.
Alfaro, J. A., et al. "The emerging landscape of single-molecule protein sequencing technologies." Nature methods 18.6 (2021): 604-617.
Brinkerhoff, H., et al. "Multiple rereads of single proteins at single-amino acid resolution using nanopores." Science 374.6574 (2021): 1509-1513.
Cui, Y., et al. "A multifunctional anchor for multimodal expansion microscopy." bioRxiv (2022): 2022-06.
Damstra, H. GJ, et al. "Visualizing cellular and tissue ultrastructure using Ten-fold Robust Expansion Microscopy (TREx)." Elife 11 (2022): e73775.
De Lannoy, C. V., et al. "Evaluation of Fret X for single-molecule protein fingerprinting." IScience 24.11 (2021).
Deen, WM, "Chapter 11: Multicomponent Energy and Mass Transfer," Analysis of Transport Phenomena (Oxford Univ Press, New York), 2nd Ed. 2011, p. 433-469.
Hong, J. M., et al. "ProtSeq: toward high-throughput, single-molecule protein sequencing via amino acid conversion into DNA barcodes." Iscience 25.1 (2022).
Kaneko, S., et al. "Photocontrol of cell adhesion on amino-bearing surfaces by reversible conjugation of poly (ethylene glycol) via a photocleavable linker." Physical Chemistry Chemical Physics 13.9 (2011): 4051-4059.
Kim, S.-Y., et al. "Stochastic electrotransport selectively enhances the transport of highly electromobile molecules." Proceedings of the National Academy of Sciences 112.46 (2015): E6274-E6283.
Kubalova et al. Prospects and limitations of expansion microscopy in chromatin ultrastructure determination. Chromosome Res. Dec. 2020;28(3-4):355-368. doi: 10.1007/s10577-020-09637-y. Epub Sep. 17, 2020. PM ID: 32939606; PMCID: PMC7691311 (Year: 2020).
Oran, D., et al. "3D nanofabrication by volumetric deposition and controlled shrinkage of patterned scaffolds." Science 362.6420 (2018): 1281-1285.
Reed, B.D., et al. "Real-time dynamic single-molecule protein sequencing on an integrated semiconductor device." Science 378.6616 (2022): 186-192.
Restrepo-Perez, L., et al. "Paving the way to single-molecule protein sequencing." Nature nanotechnology 13.9 (2018): 786-796.
Rial Verde, E., et al. "Photorelease of GABA with visible light using an inorganic caging group." Frontiers in neural circuits 2 (2008): 293.
Swaminathan, J., et al. "Highly parallel single-molecule identification of proteins in zeptomole-scale mixtures." Nature biotechnology 36.11 (2018): 1076-1082.
Van Ginkel, J., et al. "Single-molecule peptide fingerprinting." Proceedings of the National Academy of Sciences 115.13 (2018): 3338-3343.
Wang, G., et al., "Photoresponsive molecular switches for biotechnology." Journal of Photochemistry and Photobiology C: Photochemistry Reviews 13.4 (2012): 299-309.
Yuan et al., Advances in optical mapping for genomic research. Com put Struct Biotechnol J. Aug. 1, 2020 ;18:2051-2062. doi: 10.1016/j.csbj.2020.07.018. PMID: 32802277; PMCID: PMC7419273; (Year: 2020).
Zong, W., et al. "Fast high-resolution miniature two-photon microscopy for brain imaging in freely behaving mice." Nature methods 14.7 (2017): 713-719.

(56) References Cited

OTHER PUBLICATIONS

Gao, R, et al. "Q&A: expansion microscopy." BMC biology 15 (2017): 1-9.

Sarkar, D., et al. "Revealing nanostructures in brain tissue via protein decrowding by iterative expansion microscopy." Nature biomedical engineering 6.9 (2022): 1057-1073.

Neely, R.K. et al., "Optical mapping of DNA: Single-molecule-based methods for mapping genomes." Biopolymers 95.5 (2011): 298-311.

Gann et al., Development of a nuclear morphometric signature for prostate cancer risk in negative biopsies, PLoS One, Jul. 26, 2013, pp. 1-9, doi: 10.1371/journal.pone.0069457.

Wang et al., Detection and classification of thyroid follicular lesions based on nuclear structure from histopathology images, Cytometry A May 2010, 77(5):485-94, doi: 10.1002/cyto.a.20853. PMID: 20099247; PMCID: PMC3010854.

\* cited by examiner (a)
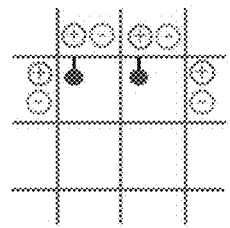
(b)
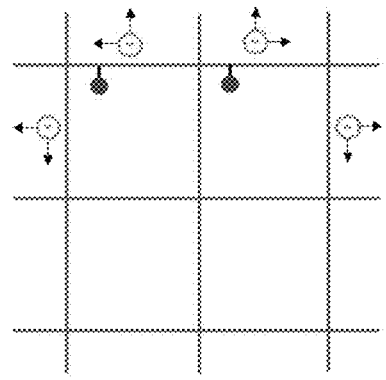
FIG. 1A
FIG. 1B
(d)
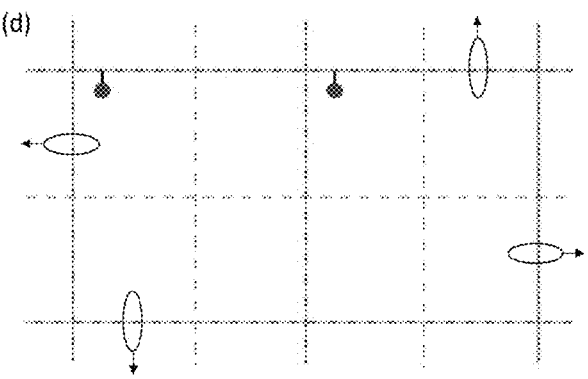
(c)
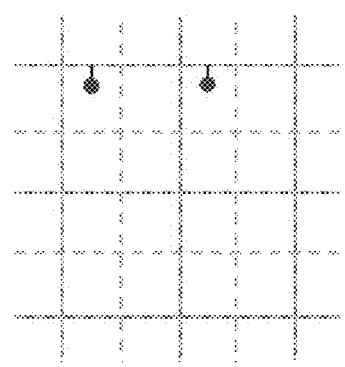
FIG. 1D
FIG. 1C

ITERATIVE DIRECT EXPANSION MICROSCOPY

RELATED APPLICATIONS

This application claims the benefit of U.S. Provisional Application Ser. No. 62/809,062, filed on Feb. 22, 2019, the contents of which are incorporated herein by reference in its entirety.

GOVERNMENT SUPPORT

This invention was made with U.S. Government Support under Grant Number 2014509, awarded by US-Israel Binational Science Foundation Grant. The Government may have certain rights in this invention.

BACKGROUND OF THE INVENTION

Understanding the nanoscale organizations of biomolecules in complex biological systems such as the brain, can not only provide fundamental biological insights but also help in the discovery of new targets and technologies for treating diseases. Optical microscopy provides a convenient way for imaging biological samples using readily available dyes/antibodies. However, the spatial resolution of conventional optical microscopes is limited to 300 nm due to the diffraction of light waves. On the other hand, existing super-resolution optical techniques, face challenges in scalability to thick tissues and require extremely expensive hardware, which limits their application.

Recently discovered expansion microscopy (ExM), which is based on physically expanding the sample (embedded in a swellable gel) by about 4.5× and thus, achieving an effective resolution of 70 nm, is scalable and compatible with conventional optical hardware. The resolution can be improved through iterative ExM (iExM). The iExM process requires transfer of biomolecules from one gel to another, with the cleaving of the first gel, which makes the process complex and potentially non-compatible for imaging of RNA or biomolecular retention for post-processing.

SUMMARY OF THE INVENTION

The present invention biological samples of interest that have been iteratively expanded more than once, in a method referred to herein as iterative direct expansion microscopy (id-ExM). In the id-ExM method, biological samples of interest are permeated with a swellable material that results in the sample becoming embedded in the swellable material, and then the sample can be expanded isotropically in three dimensions The process of iteratively expanding the samples can be applied to expand samples one or more additional times such that, for example, a 5-fold expanded sample can be expanded again to achieve high expansion factors, for example, 20× to 100× or more linear expansion.

BRIEF DESCRIPTION OF THE DRAWINGS

The patent or application file contains at least one drawing executed in color. Copies of this patent or patent application publication with color drawings will be provided to the Office upon request and payment of the necessary fee.

FIG. 1A through FIG. 1D—One schematic diagram of the id-ExM process. (a) Biomolecules shown in red are attached to the $1^{st}$ polymer network or gel (represented by blue lines). (b) After addition of water, the positive ions get washed away and the repulsion between negative ions causes the gel to expand. (c) The $2^{nd}$ polymer network (represented by grey dashed lines) is integrated into the $1^{st}$ polymer. (d) A force F that enables the $2^{nd}$ polymer to expand is applied. For example, the $2^{nd}$ polymer can be expanded due to electrostatic forces on application of water. As the $2^{nd}$ polymer expands, it exerts mechanical force on the $1^{st}$ polymer which expands along with the $2^{nd}$ polymer.

DETAILED DESCRIPTION OF THE INVENTION

Figure 2A:
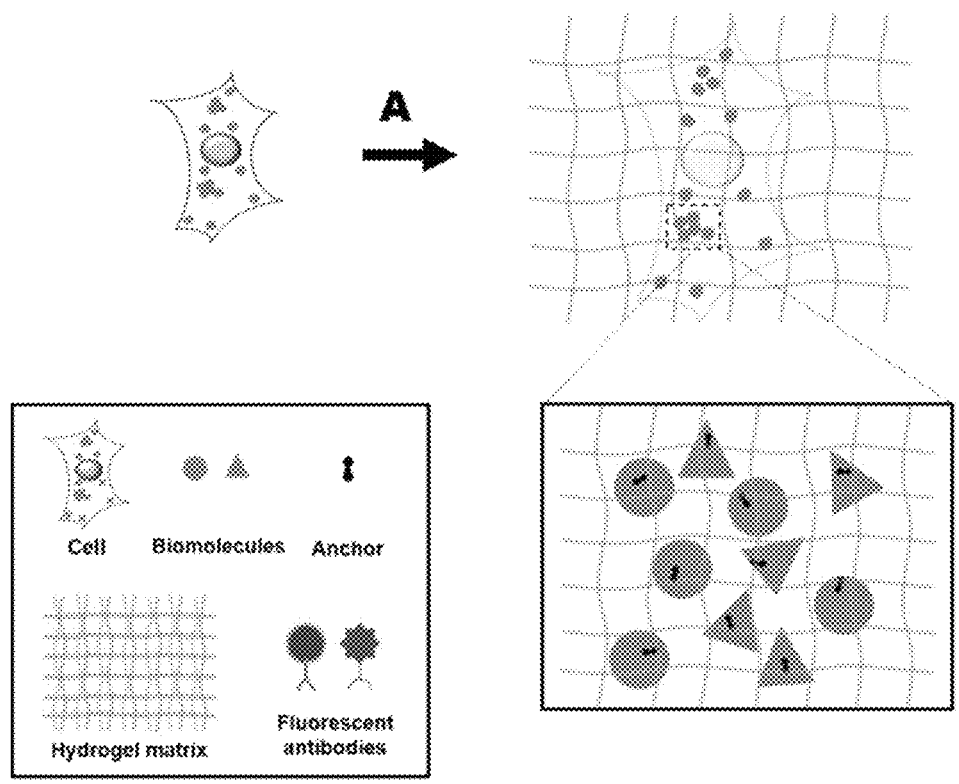
FIG. 2A through FIG. 2D-A workflow and concept of Iterative Direct Anchoring Expansion Microscopy (idExM). (A) Anchoring and gelation. Samples are contacted with biomolecule anchoring reagents to retain endogenous biomolecules. Subsequently, the sample is embedded in the swellable hydrogel, mechanically homogenized and expanded in water. (B) Re-embedding. The expanded gel is then re-embedded in a charge-neutral gel followed by the formation of a 2° swellable hydrogel within the re-embedded first gel. (C) The specimen is then expanded via the addition of water. (D) Post-expansion staining. Post-expansion labels against proteins can be applied in the form of antibodies.
Figure 2B:
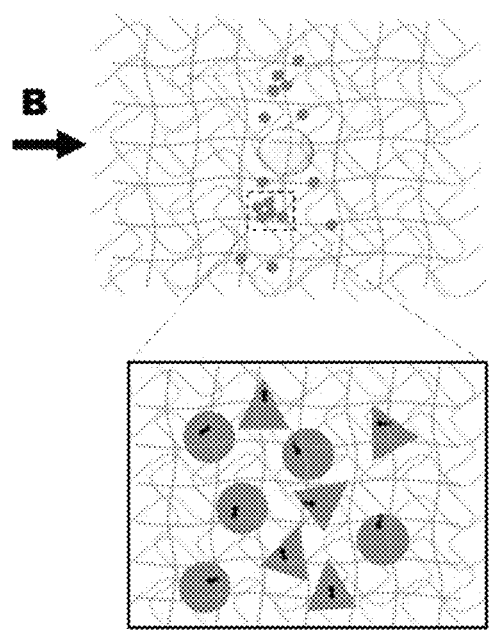
Figure 2C:
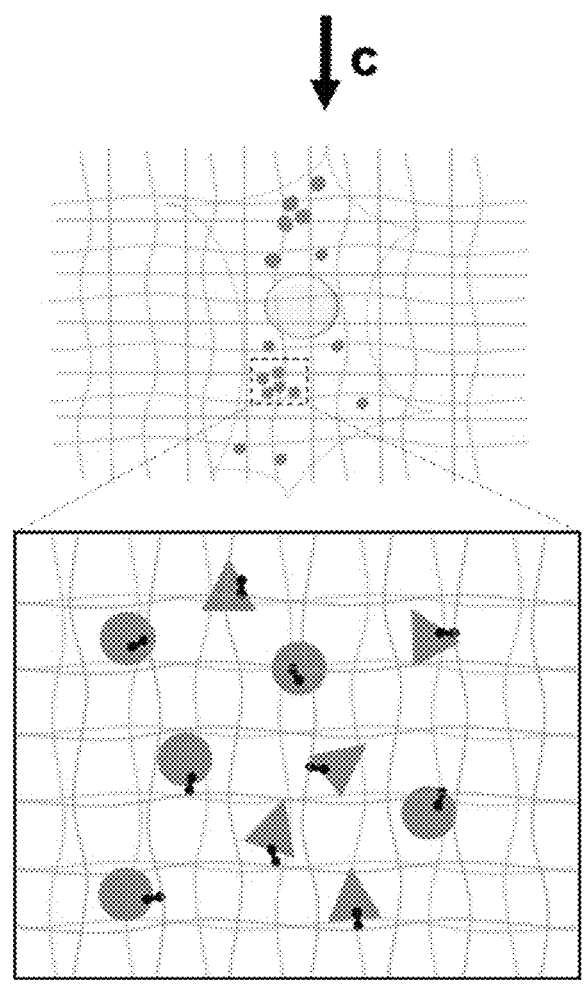
Figure 2D:
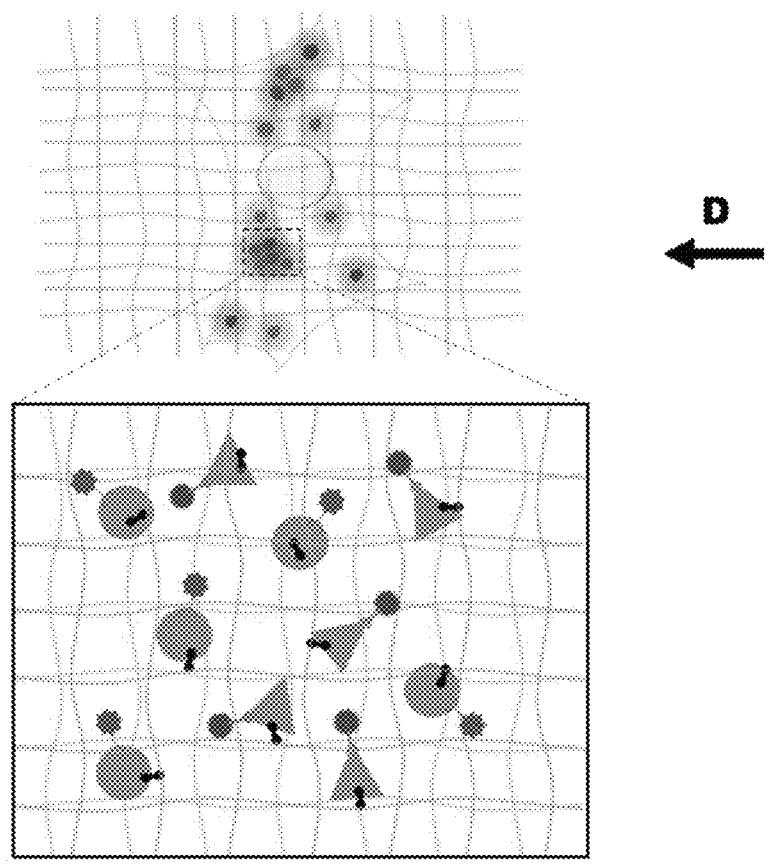

As used herein and in the appended claims, the singular forms "a", "an", and "the" are defined to mean "one or more" and include the plural unless the context clearly dictates otherwise. It is further noted that the claims can be drafted to exclude any optional element. As such, this statement is intended to serve as antecedent basis for use of such exclusive terminology as "solely," "only" and the like in connection with the recitation of claim elements or use of a "negative" limitation.

As will be apparent to those of skill in the art upon reading this disclosure, each of the individual embodiments described and illustrated herein has discrete components and features which can be readily separated from or combined with the features of any of the other several embodiments without departing from the scope or spirit of the present teachings. Any recited method can be carried out in the order of events recited or in any other order which is logically possible.

The present invention provides compositions and methods that allow enlarging a sample of interest to be performed iteratively without the need for gel cleaving or transfer of biomolecules. This technology, referred to herein as iterative direct ExM or id-ExM, utilizes electrostatic and/or mechanical forces for enlarging a sample to achieve high expansion factors (e.g., 20× to 100×) and enables super-resolution imaging without the need for any specialized or expensive hardware. By "enlarging a sample of interest" it is generally meant that the sample is physically expanded, or enlarged, relative to the sample prior to be exposed to the method(s) described herein. Enlarging the sample can be achieved by binding, e.g., anchoring, key biomolecules to a polymer network and swelling, or expanding, the polymer network, thereby moving the biomolecules apart as further described below. As the biomolecules are anchored to the polymer network isotropic expansion of the polymer network retains the spatial orientation of the biomolecules resulting in an expanded, or enlarged, sample.

In one embodiment, the invention provides methods for enlarging a sample of interest for microscopy, the method comprising the steps of:

the steps of:

a) contacting the sample with a biomolecule anchoring agent (BAA), wherein the BAA comprises a biomolecule binding moiety and an anchor;
  b) embedding the sample in a swellable material;
  c) subjecting the sample to a disruption of the endogenous physical structure of the sample;
  d) swelling the swellable material resulting in an enlargement of the sample;
  e) re-embedding the enlarged sample in a non-swellable material to form an enlarged sample hybrid;
  f) embedding the enlarged sample hybrid in second swellable material; and
  g) swelling the second swellable material to further enlarge the sample.

In one embodiment, steps (e) through (g) are repeated to form a further enlarged sample. This further enlarged sample may be further enlarged by the same process if desired.

As used herein, the term "sample of interest" generally refers to, but is not limited to, a biological, chemical or biochemical sample. In one embodiment, the sample of interest includes, but is not limited to, a tissue sample, a cell, or any components thereof.

A sample of interest is used herein in a broad sense and is intended to include sources that contain biomolecules and can be fixed. Exemplary tissue samples include, but are not limited to liver, spleen, kidney, lung, intestine, thymus, colon, tonsil, testis, skin, brain, heart, muscle and pancreas tissue. Other exemplary tissue samples include, but are not limited to, biopsies, bone marrow samples, organ samples, skin fragments and organisms. Materials obtained from clinical or forensic settings are also within the intended meaning of the term tissue sample. In one embodiment, the sample is derived from a human, animal or plant. In one embodiment, samples are human. The sample can be obtained, for example, from autopsy, biopsy or from surgery. It can be a solid tissue such as, for example, parenchyme, connective or fatty tissue, heart or skeletal muscle, smooth muscle, skin, brain, nerve, kidney, liver, spleen, breast, carcinoma (e.g. bowel, nasopharynx, breast, lung, stomach etc.), cartilage, lymphoma, meningioma, placenta, prostate, thymus, tonsil, umbilical cord or uterus. The tissue can be a tumor (benign or malignant), cancerous or precancerous tissue. The sample can be obtained from an animal or human subject affected by disease or other pathology or suspected of same (normal or diseased), or considered normal or healthy. As used herein, the term "tissue sample" explicitly excludes cell-free samples, for example cell extracts, wherein cytoplasmic and/or nuclear components from cells are isolated.

Tissue samples suitable for use with the methods and systems described herein generally include any type of tissue samples collected from living or dead subjects, such as, e.g., biopsy specimens and autopsy specimens. Tissue samples may be collected and processed using the methods and systems described herein and subjected to microscopic analysis immediately following processing, or may be preserved and subjected to microscopic analysis at a future time, e.g., after storage for an extended period of time. In some embodiments, the methods described herein may be used to preserve tissue samples in a stable, accessible and fully intact form for future analysis. For example, tissue samples, such as, e.g., human brain tissue samples, may be processed as described above and cleared to remove a plurality of cellular components, such as, e.g., lipids, and then stored for future analysis.

Tissues that have been preserved, or fixed, contain a variety of chemical modifications that can reduce the detectability of proteins in biomedical procedures. In some embodiments, the methods and systems described herein may be used to analyze a previously-preserved or stored tissue sample. Previously preserved tissue samples include, for example, clinical samples used in pathology including formalin-fixed paraffin-embedded (FFPE), hematoxylin and eosin (H&E)-stained, and/or fresh frozen tissue samples. If the previously preserved sample has a coverslip, the coverslip should be removed. The sample is treated to remove the mounting medium. Such methods for removing the mounting medium are well known in the art. For example, treating the sample with xylene to remove paraffin or other hydrophobic mounting medium.

Alternatively, if the sample is mounted in a water-based mounting medium, the sample is treated with water. The sample is then then rehydrated and subjected to antigen-retrieval. The term "antigen retrieval" refers to any technique in which the masking of an epitope is reversed and epitope-antibody binding is restored such as, but not limited to, enzyme induced epitope retrieval, heat induced epitope retrieval (HIER), or proteolytic induced epitope retrieval (PIER). For example, the antigen retrieval treatment can be performed in a 10 mM sodium citrate buffer as well as the commercially available Target Retrieval Solution (DakoCytomation) or such.

In one embodiment, the cell or tissue sample can be labeled or tagged with a detectable label. Typically, the label or tag will bind chemically (e.g., covalently, hydrogen bonding or ionic bonding) to a biomolecule of the sample, or a component thereof. The detectable label can be selective for a specific target (e.g., a biomarker or class of molecule), as can be accomplished with an antibody or other target specific binder. The detectable label may comprise a visible component, as is typical of a dye or fluorescent molecule; however, any signaling means used by the label is also contemplated. A fluorescently labeled biological sample, for example, is a biological sample labeled through techniques such as, but not limited to, immunofluorescence, immunohistochemical or immunocytochemical staining to assist in microscopic analysis. In one embodiment, the detectable label is chemically attached to the biological sample, or a targeted component thereof. In one embodiment, the detectable label is an antibody and/or fluorescent dye wherein the antibody and/or fluorescent dye, further comprises a physical, biological, or chemical anchor or moiety that attaches or crosslinks the cell or tissue sample to the polymer. The labeled sample may furthermore include more than one label. For example, each label can have a particular or distinguishable fluorescent property, e.g., distinguishable excitation and emission wavelengths. Further, each label can have a different target specific binder that is selective for a specific and distinguishable target in, or component of the sample.

In one embodiment, the biomolecule anchoring agent (BAA) is a bi-functional linker wherein the bi-functional linker comprises a binding moiety and anchor, wherein the binding moiety binds to biomolecules in the sample. The anchor may be a physical, biological, or chemical moiety that attaches or crosslinks the sample to the swellable material. This may be accomplished by crosslinking the anchor with the swellable material, such as during or after the polymerization, i.e., in situ formation of the swellable material.

In some embodiments, the anchor may comprise a polymerizable moiety. The anchor may include, but is not limited to, vinyl or vinyl monomers such as styrene and its derivatives (e.g., divinyl benzene), acrylamide and its derivatives, butadiene, acrylonitrile, vinyl acetate, or acrylates and acrylic acid derivatives. The polymerizable moiety may be, for example, an acrylamide modified moiety that may be covalently fixed within a swellable material.

In some embodiments, the biomolecule anchoring agent (BAA) comprises reactive groups to functional groups (e.g., primary amines or sulfhydryls) on biomolecules within the sample. The BAA may be used to chemically modify the amine group of biomolecules with a swellable material functional group, which enables antibodies and/or other endogenous biomolecules within the sample to be directly anchored to, or incorporate into, the swellable material.

In one embodiment, the biomolecule anchoring agent (BAA) is a hetero-bifunctional crosslinker. Hetero-bifunctional crosslinkers possess different reactive groups at either end of a spacer arm, i.e., atoms, spacers or linkers separating the reactive groups. These reagents not only allow for single-step conjugation of molecules that have the respective target functional group, but they also allow for sequential (two-steps) conjugations that minimize undesirable polymerization or self-conjugation. The biomolecule anchoring agent (BAA) may be a small molecule linker or a nucleic acid adaptor.

As used herein, a "nucleic acid adaptor" is a nucleic acid sequence having a binding moiety capable of attaching to a target nucleic acid and an anchor moiety capable of attaching to the swellable material. Attaching the nucleic acid adaptor to a target nucleic acid may be accomplished by hybridization or by ligation in situ. For example, DNA adaptors may be ligated to the 3' ends of the RNAs in the sample with RNA ligases, such as T4 RNA ligase, or may be attached via a chemical linker such as a reactive amine group capable of reacting with target nucleic acid. Acrylamide modified oligonucleotide primers may be covalently fixed within a swellable material such as a polyacrylate gel. As used herein, the term "acrylamide modified" in reference to an oligonucleotide means that the oligonucleotide has an acrylamide moiety attached to the 5' end of the molecule.

As used herein, a "small molecule linker" is a small molecule having a binding moiety capable of attaching to a target nucleic acid and an anchor moiety capable of attaching to the swellable material. Attaching the small molecule linker to the target nucleic acid may be accomplished by hybridization or by a chemical reactive group capable of covalently binding the target nucleic acid. For example, LABEL-IT® Amine (MirusBio) is a small molecule with alkylating group that primarily reacts to the N7 of guanine, thereby allowing covalent binding of RNA and DNA. The small molecule linker may be, for example, acrylamide modified and therefore may be covalently fixed within a swellable material. As used herein, the term "acrylamide modified" in reference to a small molecule linker means that the small molecule linker has an acrylamide moiety.

In one embodiment, the biomolecule anchoring agent (BAA) may comprise a protein-reactive chemical moiety and an anchor. The protein-reactive chemical group includes, but is not limited to, N-hydroxysuccinimide (NHS) ester, thiol, amine, maleimide, imidoester, pyridyldithiol, hydrazide, phthalimide, diazirine, aryl azide, isocyanate, or carboxylic acid, which, for example, can be reacted with amino or carboxylic acid groups on proteins or peptides. In one embodiment, the protein-reactive groups include, but are not limited to, N-succinimidyl ester, pentafluorophenyl ester, carboxylic acid, or thiol.

In one embodiment, the protein-reactive chemical group is a succinimidyl ester of 6-((acryloyl)amino)hexanoic acid (acryloyl-X, SE; abbreviated "AcX"; Life Technologies). Treatment with AcX modifies amines on proteins with an acrylamide functional group. The acrylamide functional groups allows for proteins to be anchored to the swellable polymer as it is synthesized in situ.

In one embodiment, the proteins of the sample can be modified with the protein-reactive group and the anchor in separate steps using click chemistry. Click chemistry, also referred to as tagging, is a class of biocompatible reactions intended primarily to join substrates of choice with specific biomolecules. In this method, proteins of the sample of interest are treated with a protein-reactive group comprising a click group and then treated with an anchor comprising a complementary click group. Complementary groups include, but are not limited to, azide groups and terminal alkynes (see e.g., H. C. Kolb; M. G. Finn; K B. Sharpless (2001). *"Click Chemistry: Diverse Chemical Function from a Few Good Reactions". Angewandte Chemie International Edition.* 40(11): 2004-2021, which is incorporated herein by reference).

As used herein, the term "attach" or "attached" refers to both covalent interactions and noncovalent interactions. In certain embodiments of the invention, covalent attachment may be used, but generally all that is required is that the bi-functional linker remain attached to the target nucleic acid under conditions for nucleic acid amplification and/or sequencing. Oligonucleotide adaptors may be attached such that a 3' end is available for enzymatic extension and at least a portion of the sequence is capable of hybridizing to a complementary sequence. Attachment can occur via hybridization to the target nucleic acid, in which case the attached oligonucleotide may be in the 3'-5' orientation. Alternatively, attachment can occur by means other than base-pairing hybridization, such as the covalent attachment set forth above. The term "attach" may be used interchangeably herein with the terms, "anchor(ed)", affix(ed), link(ed) and immobilize(d).

As used herein, the terms "swellable material" and "swellable polymer" are used interchangeably and generally refers to a material that expands when contacted with a liquid, such as water or other solvent. Additionally, or alternatively, the swellable material can be expanded by any other means known to one of skill in the art. In some embodiments, the swellable material uniformly expands in three dimensions. Additionally, or alternatively, the material is transparent such that, upon expansion, light can pass through the sample. The first swellable material and the second swellable material may be the same or different swellable materials.

In one embodiment, the swellable material is formed in situ from precursors thereof. Embedding the sample in the swellable material comprises permeating the sample with a composition comprising one or more precursors thereof throughout the sample and polymerizing and/or crosslinking the monomers or precursors to form the swellable material. In this manner the sample of interest is embedded in the swellable material.

In one embodiment, the sample of interest and each iteratively enlarged sample is permeated with one or more monomers or precursors or a solution comprising one or more monomers or precursors which are then reacted (e.g., polymerized) to form a swellable or non-swellable material depending on what step of the method is being performed.

By "precursors of a swellable material" it is meant hydrophilic monomers, prepolymers, or polymers that can be crosslinked, or "polymerized", to form a three-dimensional (3D) hydrogel network. Precursors can also comprise polymerization initiators and crosslinkers.

In one embodiment the swellable material is a polyelectrolyte. In one embodiment, the swellable material is polyacrylate or polyacrylamide and copolymers or crosslinked copolymers thereof.

In some embodiments, one or more polymerizable materials, monomers or oligomers can be used, such as monomers selected from the group consisting of water soluble groups containing a polymerizable ethylenically unsaturated group. Monomers or oligomers can comprise one or more substituted or unsubstituted methacrylates, acrylates, acrylamides, methacrylamides, vinylalcohols, vinylamines, allylamines, allylalcohols, including divinylic crosslinkers thereof (e.g., N, N-alkylene bisacrylamides).

In one embodiment, the precursor of the swellable material comprises at least one polyelectrolyte monomer and a covalent crosslinker. In one embodiment, the swellable material is a hydrogel. In one embodiment, the hydrogel is a polyacrylate hydrogel. In one embodiment, the precursor of the swellable material comprises acrylate, acrylamide, and a crosslinker selected from N,N-methylenebisacrylamide (BIS), N,N'-(1,2-Dihydroxyethylene)bisacrylamide) (DHEBA); and N,N'-Bis(acryloyl)cystamine(BAC).

The precursors of the swellable polymer may be delivered to the biological specimen by any convenient method including, but not limited to, permeating, perfusing, infusing, soaking, adding or other intermixing the sample with the precursors of swellable material. In this manner, the biological specimen is saturated with precursors of the swellable material, which flow between and around biomolecules throughout the specimen.

Following permeating the specimen, the swellable polymer precursors are polymerized, i.e., covalently or physically crosslinked, to form a polymer network. The polymer network is formed within and throughout the specimen. In this manner, the biological specimen is saturated with the swellable material, which flow between and around biomolecules throughout the specimen.

Polymerization may be by any method including, but not limited to, thermal crosslinking, chemical crosslinking, physical crosslinking, ionic crosslinking, photo-crosslinking, irradiative crosslinking (e.g., x-ray, electron beam), and the like, and may be selected based on the type of hydrogel used and knowledge in the art. In one embodiment, the polymer is a hydrogel. Once polymerized, a polymer-embedded biological specimen is formed.

In one embodiment, the swellable polymer is polyacrylate and copolymers or crosslinked copolymers thereof. For example, if the biological sample is to be embedded in sodium polyacrylate, a solution comprising the monomers sodium acrylate and acrylamide, and a crosslinker selected from N,N-methylenebisacrylamide (BIS), N,N'-(1,2-Dihydroxyethylene)bisacrylamide), and (DHEBA) N,N'-Bis(acryloyl)cystamine(BAC), are perfused throughout the sample.

In one embodiment, the swellable material is a swellable polymer or hydrogel. The hydrogel may be a polyelectrolyte hydrogel. The polyelectrolyte may be a polyacrylate.

By embedding a specimen in a swellable polymer that physically supports the ultrastructure of the specimen this technology preserves the biomolecules (e.g., proteins, small peptides, small molecules, and nucleic acids in the specimen) in their three-dimensional distribution, secured by the polymer network. By bypassing destructive sectioning of the specimen, subcellular structures may be analyzed. In addition, the specimen can be iteratively stained, unstained, and restained with other reagents for comprehensive analysis.

In some embodiments, native proteins anchored to the swellable polymer perfused throughout the sample as described herein can retain epitope functionality and be labeled post-expansion if the nonspecific proteolysis of ExM is replaced with modified post-gelation homogenization treatments. Such approaches may overcome the limitations inherent to delivering antibodies in the crowded environment of native tissue.

In some embodiments, the composition can comprise a detectable label, tag or other feature of interest (for example, fluorescent dye molecules that have been delivered to the biological sample via antibody staining) which can be anchored (e.g., chemically) into the hydrogel before expansion. Following anchoring, the sample is subjected to a disruption of the underlying network of biological molecules, leaving the tags of interest (e.g., the fluorescent dye molecules) intact and anchored to the gel. In this way, the mechanical properties of the swellable material-sample complex are rendered more spatially uniform, allowing isotropic expansion with minimal artifacts.

In one embodiment the sample is anchored to the swellable material before expansion. This can be accomplished by chemically crosslinking the polymerizable moiety of the biomolecule anchoring agent with the swellable material, such as during or after the polymerization or in situ formation of the swellable material.

"Re-embedding" the expanded sample in a non-swellable material (also referred to as a re-embedding gel) comprises permeating (such as, perfusing, infusing, soaking, adding or other intermixing) the sample with the non-swellable material, preferably by adding precursors thereof. Alternatively, or additionally, embedding the sample in a non-swellable material comprises permeating one or more monomers or other precursors throughout the sample and polymerizing and/or crosslinking the monomers or precursors to form the non-swellable material or polymer. In this manner the first enlarged sample, for example, is embedded in the non-swellable material. Embedding the expanded sample in a non-swellable material prevent conformational changes (e.g., shrinkage) during the following steps despite salt concentration variation. The non-swellable material can be charge-neutral hydrogels. For example, it can be polyacrylamide hydrogel, composed of acrylamide monomers, bisacrylamide crosslinker, ammonium persulfate (APS) initiator and tetramethylethylenediamine (TEMED) accelerator.

In certain embodiments, the sample of interest, or a labeled sample, can, optionally, be treated with a detergent prior to being contacted with the one or more swellable material precursors. The use of a detergent can improve the wettability of the sample or disrupt the sample to allow the one or more swellable monomer precursors to permeate throughout sample.

After the sample has been anchored to the polymer, the sample may be subjected to a disruption of the endogenous biological molecules or the physical structure of the biological sample. The disruption of the endogenous physical structure of the sample or of the endogenous biomolecules of the sample generally refers to the mechanical, physical, chemical, biochemical or, enzymatic digestion, disruption or break up of the sample so that it will not resist expansion. In this way, the mechanical properties of the sample-swellable material complex are rendered more spatially uniform, allowing greater and more consistent isotropic expansion.

It is preferable that the disruption does not impact the structure of the swellable material but disrupts the structure of the sample. Thus, the sample disruption should be substantially inert to the swellable material. The degree of digestion can be sufficient to compromise the integrity of the mechanical structure of the sample or it can be complete to the extent that the sample-swellable material complex is rendered substantially free of the sample.

In one embodiment, the physical disruption of the sample is accomplished by a mild disruption treatment that minimizes damage to the individual proteins, allowing staining and other treatments on the proteins to be carried out after expansion. In some embodiments, such milder treatment is performed by using LyC. In some embodiments, such milder treatment is performed by heating the sample. In some embodiments, heating the sample is performed by autoclaving the sample.

The expandable cell or tissue sample can be expanded by contacting the sample-polymer complex with a solvent or liquid to cause the polymer to swell. By expanding, or swelling, the expandable sample it is generally meant that the sample is physically expanded, or enlarged, relative to the sample prior to be exposed to the method(s) described herein.

The swelling of the swellable material results in the sample itself expanding (e.g., becoming larger). This is because the swellable material is embedded throughout the sample, therefore, by binding, e.g., anchoring, biomolecules to the swellable material and swelling, or expanding, the swellable material, the biomolecules are thereby moved apart. In one embodiment, the swellable material expands (swells) isotropically. As the biomolecules are anchored to the polymer network isotropic expansion of the polymer network retains the spatial orientation of the biomolecules resulting in an expanded, or enlarged, sample.

The expanded sample can then be subjected to microscopic analysis. By "microscopic analysis" it is meant the analysis of a sample using any technique that provides for the visualization of aspects of a sample that cannot be seen with the unaided eye, i.e., that are not within the resolution range of the normal eye.

The expanded sample-polymer complex can be imaged on any optical microscope, allowing effective imaging of features below the classical diffraction limit. Since the resultant expanded sample can be transparent, custom microscopes capable of large volume, wide field of view, 3D scanning may also be used in conjunction with the expanded sample.

Because biomolecules of the sample are anchored to a polymer that physically supports the ultrastructure of the sample, cellular components (e.g. lipids) that normally provide structural support but that hinder visualization of subcellular proteins and molecules may be removed while preserving the 3-dimensional architecture of the cells and tissue. This removal renders the interior of sample substantially permeable to light and/or macromolecules, allowing the interior of the sample, e.g. cells and subcellular structures, to be microscopically visualized without time-consuming and disruptive sectioning.

Additionally, the sample can be iteratively stained, unstained, and re-stained with other reagents for comprehensive analysis.

By "biomolecules" it is generally meant, but not limited to, proteins, lipids, steroids, nucleic acids, and sub-cellular structures within a tissue or cell.

By "macromolecules" is meant proteins, nucleic acids, or small molecules that target biomolecules within the sample. These macromolecules are used to detect biomolecules within the sample and/or anchor the biolmolecules to the swellable polymer. For example, macromolecules may be provided that promote the visualization of particular cellular biomolecules, e.g., proteins, lipids, steroids, nucleic acids, etc. and sub-cellular structures. In some embodiments, the macromolecules are diagnostic. In some embodiments, the macromolecules are prognostic. In some embodiments, the macromolecules are predictive of responsiveness to a therapy. In some embodiments, the macromolecules are candidate agents in a screen, e.g., a screen for agents that will aid in the diagnosis and/or prognosis of disease, in the treatment of a disease, and the like.

As an example, the sample may be contacted with one or more polypeptide macromolecules, e.g. antibodies, labeled peptides, and the like, that are specific for and will bind to particular cellular biomolecules for either direct or indirect labeling by color or immunofluorescence. By immunofluorescence it is meant a technique that uses the highly specific binding of an antibody to its antigen or binding partner in order to label specific proteins or other molecules within the cell. A sample is treated with a primary antibody specific for the biomolecule of interest. A fluorophore can be directly conjugated to the primary antibody or peptide. Alternatively, a secondary antibody conjugated to a detection moiety or fluorophore, which binds specifically to the first antibody can be used. Peptides that are specific for a target cellular biomolecule and that are conjugated to a fluorophore or other detection moiety may also be employed.

Another example of a class of agents that may be provided as macromolecules is nucleic acids. For example, a sample may be contacted with an antisense RNA that is complementary to and specifically hybridizes to a transcript of a gene of interest, e.g., to study gene expression in cells of the sample. As another example, a sample may be contacted with a DNA that is complementary to and specifically hybridizes to genomic material of interest, e.g., to study genetic mutations, e.g., loss of heterozygosity, gene duplication, chromosomal inversions, and the like. The hybridizing RNA or DNA is conjugated to detection moieties, i.e., agents that may be either directly or indirectly visualized microscopically. Examples of in situ hybridization techniques may be found at, for example, Harris and Wilkinson. In situ hybridization: Application to developmental biology and medicine, Cambridge University Press 1990; and Fluorescence In Situ Hybridization (FISH) Application Guide. Liehr, T, ed., Springer-Verlag, Berlin Heidelberg 1990.

In some embodiments, the fixed biological sample is subjected to passivation. As used herein the term "passivation" refers to the process for rendering the sample less reactive with the components contained within the fixative such as by functionalizing the fixative with chemical reagents to neutralize charges within. For example, the carboxylic groups of acrylate, which may be used in the swellable gel, can inhibit downstream enzymatic reactions. Treating the swellable gel composed of acrylate with 1-Ethyl-3-(3-dimethylaminopropyl)carbodiimide (EDC) and N-Hydroxysuccinimide (NETS) allows primary amines to covalently bind the carboxylic groups to form charge neutral amides and passivate the swellable gel.

The innovation enables physical expansion of common clinical tissue sample based on the unique physical and chemical properties of clinical tissue samples. Clinical tissue samples are usually highly fixed, tightly attached on the superfrost glass slides, and embedded in the paraffin (or stained and mounted in a mounting medium) for long-term storage. Some clinical tissue samples are stained with dyes, such as hematoxylin and eosin (H&E), which are incompatible with fluorescence imaging. To apply ExM to clinical samples, de-paraffinization, antigen retrieval and aggressive protease digestion are integrated in a comprehensive workflow to handle various kinds of common clinical samples. De-paraffinization and antigen retrieval address the recovery of archived clinical samples, while aggressive protease digestion is critical for the success of sample expansion, as most of the human tissues contain abundant hard-to-digest structural proteins, such as collagen and fibronectin, which prevent homogeneous expansion of the sample. Taken together, the present invention allows for the application of ExM to the enormous amount of archived clinical samples and enable super-resolution optical interrogations of mechanisms of a broad range of diseases by conventional optical microscopy.

This invention provides a comprehensive workflow to facilitate expansion of common types of clinical samples for super-resolution molecular imaging. The methods described herein will result in optimal outcomes, such as proper immunostaining, sufficient digestion of tissue, high quality of polymer synthesis, and maintenance of proteins of interest during expansion. The invention also describes the reutilization of classic H&E stained slides for further biomolecular interrogation in nanoscale level. In general, H&E stained slides are not considered suitable for further downstream processing due to the difficulty in removing the stain and mounting medium. Thus, the invention describes a unique and cost-effective approach to overcome this barrier and enable the extraction of more information from the used H&E slides. In one embodiment, the method of expanding H&E stained slides for further utilization combines xylene-ethanol-water sequential washing, protein anchoring and in situ polymer synthesis.

The subject methods find many uses. For example, the subject methods may be applied to preparing specimens for the study of the connectivity of the central nervous system. "Connectivity" as used herein generally means the connections between neurons, and includes connections at the single cell level, e.g., synapses, axon termini, dendritic spines, etc., as well as connections between groups of neurons and regions of the CNS as major axon tracts, e.g., corpus callosum (CC), anterior commissure (AC), hippocampal commissure (HC), pyramidal decussation, pyramidal tracts, external capsule, internal capsule (IC), cerebral peduncle (CP), etc. A whole brain and/or spinal cord specimen or region thereof (e.g. cerebrum (i.e., cerebral cortex), cerebellum (i.e., cerebellar cortex), ventral region of the forebrain (e.g., striatum, caudate, putamen, globus pallidus, nucleus accumbens; septal nuclei, subthalamic nucleus); regions and nuclei of the thalamus and hypothalamus; regions and nuclei of the deep cerebellum (e.g., dentate nucleus, globose nucleus, emboliform nucleus, fastigial nucleus) and brainstem (e.g., substantia *nigra*, red nucleus, pons, olivary nuclei, cranial nerve nuclei); and regions of the spine (e.g., anterior horn, lateral horn, posterior horn)) may be prepared post-mortem by the subject methods and the connectivity of the neurons therein microscopically analyzed, e.g., obtained, stored, rendered, used, and actuated, e.g., to provide the full connectivity of a brain, e.g., a human brain, after death. Such studies will contribute greatly to the understanding of how the brain develops and functions in health and during disease, and of the underpinnings of cognition and personality.

As another example, the subject methods may be employed to evaluate, diagnose or monitor a disease. "Diagnosis" as used herein generally includes a prediction of a subject's susceptibility to a disease or disorder, determination as to whether a subject is presently affected by a disease or disorder, prognosis of a subject affected by a disease or disorder (e.g., identification of cancerous states, stages of cancer, likelihood that a patient will die from the cancer), prediction of a subject's responsiveness to treatment for a disease or disorder (e.g., a positive response, a negative response, no response at all to, e.g., allogeneic hematopoietic stem cell transplantation, chemotherapy, radiation therapy, antibody therapy, small molecule compound therapy) and use of therametrics (e.g., monitoring a subject's condition to provide information as to the effect or efficacy of therapy). For example, a biopsy may be prepared from a cancerous tissue and microscopically analyzed to determine the type of cancer, the extent to which the cancer has developed, whether the cancer will be responsive to therapeutic intervention, etc.

Diagnostic methods differ in their sensitivity and specificity. The "sensitivity" of a diagnostic assay is the percentage of diseased individuals who test positive (percent of "true positives"). Diseased individuals not detected by the assay are "false negatives." Subjects who are not diseased and who test negative in the assay are termed "true negatives." The "specificity" of a diagnostic assay is 1 minus the false positive rate, where the "false positive" rate is defined as the proportion of those without the disease who test positive. While a particular diagnostic method may not provide a definitive diagnosis of a condition, it suffices if the method provides a positive indication that aids in diagnosis.

As used herein the phrase "diagnosing" refers to classifying a disease or a symptom, determining a severity of the disease, monitoring disease progression, forecasting an outcome of a disease and/or prospects of recovery. The term "detecting" may also optionally encompass any of the above.

As another example, a biopsy may be prepared from a diseased tissue, e.g. kidney, pancreas, stomach, etc., to determine the condition of the tissue, the extent to which the disease has developed, the likelihood that a treatment will be successful, etc. The terms "treatment", "treating" and the like are used herein to generally mean obtaining a desired pharmacologic and/or physiologic effect. The effect may be prophylactic in terms of completely or partially preventing a disease or symptom thereof and/or may be therapeutic in terms of a partial or complete cure for a disease and/or adverse effect attributable to the disease. "Treatment" as used herein covers any treatment of a disease in a mammal, and includes: (a) preventing the disease from occurring in a subject which may be predisposed to the disease but has not yet been diagnosed as having it; (b) inhibiting the disease, i.e., arresting its development; or (c) relieving the disease, i.e., causing regression of the disease. The therapeutic agent may be administered before, during or after the onset of disease or injury. The treatment of ongoing disease, where the treatment stabilizes or reduces the undesirable clinical symptoms of the patient, is of particular interest. Such treatment is desirably performed prior to complete loss of function in the affected tissues. The subject therapy will desirably be administered during the symptomatic stage of the disease, and in some cases after the symptomatic stage of the disease. The terms "individual," "subject," "host," and "patient," are used interchangeably herein and refer to any mammalian subject for whom diagnosis, treatment, or therapy is desired, particularly humans. Examples of diseases that are suitable to evaluation, analysis, diagnosis, prognosis, and/or treatment using the subject methods and systems include, but are not limited to, cancer, immune system disorders, neuropsychiatric disease, endocrine/reproductive disease, cardiovascular/pulmonary disease, musculoskeletal disease, gastrointestinal disease, and the like.

The subject methods may also be used to evaluate normal tissues, organs and cells, for example to evaluate the relationships between cells and tissues of a normal tissue sample, e.g., a tissue sample taken from a subject not known to suffer from a specific disease or condition. The subject methods may be used to investigate, e.g., relationships between cells and tissues during fetal development, such as, e.g., during development and maturation of the nervous system, as well as to investigate the relationships between cells and tissues after development has been completed, e.g., the relationships between cells and tissues of the nervous systems of a fully developed adult sample.

The subject methods also provide a useful system for screening candidate therapeutic agents for their effect on a tissue or a disease. For example, a subject, e.g. a mouse, rat, dog, primate, human, etc. may be contacted with a candidate agent, an organ or a biopsy thereof may be prepared by the subject methods, and the prepared sample microscopically analyzed for one or more cellular or tissue parameters. Parameters are quantifiable components of cells or tissues, particularly components that can be accurately measured, desirably in a high throughput system.

The subject methods may also be used to visualize the distribution of genetically encoded markers in whole tissue at subcellular resolution, for example, chromosomal abnormalities (inversions, duplications, translocations, etc.), loss of genetic heterozygosity, the presence of gene alleles indicative of a predisposition towards disease or good health, likelihood of responsiveness to therapy, ancestry, and the like. Such detection may be used in, for example, diagnosing and monitoring disease as, e.g., described above, in personalized medicine, and in studying paternity.

The present invention will be better understood in connection with the following Examples. However, it should be understood that these examples are for illustrative purposes only and are not meant to limit the scope of the invention. Various changes and modifications will be apparent to those skilled in the art and such changes and modifications including, without limitation, those relating to the formulations and/or methods of the invention may be made without departing from the spirit of the invention and the scope of the appended claims.

EXAMPLES

Example-1. id-ExM

The mechanism of id-ExM and concept of electrostatic and mechanical expansion is illustrated through the diagram as shown in FIG. 1. When the 1st gel is cast, the positive and negative ions are in a state of equilibrium (FIG. 1a). When water is added to the gel, the positive sodium ions get washed away and the negative ions in the polymer network repel each other (FIG. 1b), causing the gel to expand. At this stage the gel is in equilibrium again and will not expand further. The 1st polymer network has still room to stretch out and expand but since electrostatic equilibrium is reached, there is no net force available to stretch the polymer further. Integrating a 2nd polymer network into the 1st polymer network (FIG. 1c), such that the 2nd polymer is expandable then, as the 2nd polymer expands, it will exert mechanical force on the 1st polymer, which will thus expand along with the 2nd polymer (FIG. 1d). Throughout this process the biomolecules remain attached to the 1st polymer network and there is no need to transfer the biomolecules to the second polymer.

Example 2—Iterative-Direct Expansion (idExM) of Tissue Sections

FIG. 2 provides an example workflow of Iterative Direct Anchoring Expansion Microscopy (idExM). In this embodiment, the process of idExM begins with a fixation step that equips proteins with a biomolecule anchoring agent (e.g., a gel-anchorable chemical groups). Samples are contacted with biomolecule anchoring reagents to retain endogenous biomolecules, with acrylamide added during fixation to retain proteins. Subsequently, the sample is embedded in the swellable hydrogel, mechanically homogenized and expanded in water. (B) Re-embedding. The expanded gel is then re-embedded in a charge-neutral gel followed by the formation of a $2^{nd}$ swellable hydrogel within the re-embedded first gel. (C) The specimen is then expanded via the addition of water. (D) Post-expansion staining. Post-expansion labels against proteins can be applied in the form of antibodies.

Briefly, to prepare a sample, in this example a mouse brain section, mice are transcardially perfused with a fixative consisting of 4% Paraformaldehyde and 30% Acrylamide in 1×PBS, after which the brain is removed and sectioned on a vibratome at a thickness of 50-100 µm. Alternatively, fresh-frozen sections are fixed with the same fixative. After fixation, tissue sections are incubated with the idExM $1^{st}$ gel solution (8.625% (w/v) sodium acrylate, 2.5% (w/v) acrylamide, 0.075% (w/v) N,N'-methylenebisacrylamide, 0.2% (w/v) ammonium persulfate (APS) initiator, 0.2% (w/v) tetramethylethylenediamine (TEMED) accelerator, 0.2% (w/v), 0.01% Hydroxy-TEMPO) at 4° C. for 30 minutes. Tissue sections are then embedded in the $1^{st}$ idExM gel by incubating them in an enclosed chamber surrounded by excess 1$^{st}$ gel solution at 37° C. for two hours. After the formation of the 1$^{st}$ gel, the tissue-gel hybrid is expanded by incubating it in a denaturation buffer (200 mM SDS, 200 mM NaCl, and 50 mM Tris pH 9) at 95° C. for one hour, and then fully expanded via repeated washes with deionized water. The expanded gel is then re-embedded by incubating for two hours at room temperature in the idExM re-embedding solution (13.75% (w/v) acrylamide, 0.038% (w/v) N,N'-methylenebisacrylamide, 0.025% (w/v) ammonium persulfate (APS) initiator, 0.025% (w/v) tetramethylethylenediamine (TEMED) accelerator) while shaking, followed by incubation in a chamber with excess re-embedding solution for two hours at 45° C. The re-embedded gel is then washed several times with 1×PBS. Subsequently, the re-embedded gel is incubated for two hours in the idExM 3$^{rd}$ gel solution (8.625% (w/v) sodium acrylate, 2.5% (w/v) acrylamide, 0.038% (w/v) N,N'-methylenebisacrylamide, 0.025% (w/v) ammonium persulfate (APS) initiator, 0.025% (w/v) tetramethylethylenediamine (TEMED) accelerator, 1×PBS). The 3$^{rd}$ idExM gel is then formed by placing the re-embedded gel in an enclosed chamber at 60° C. for one hour. After this step, the gel can be fully expanded in water and trimmed axially as needed to reduce thickness to facilitate subsequent immunostaining and imaging. Immunostaining is then performed as needed with the appropriate antibodies and blocking solution. Both primary and secondary antibodies are incubated at 4° C. overnight to allow sufficient antibody penetration into the gel.

Example-3. Nanoscale Imaging of Dense Protein Structures in Synapse

Apart from the general proteomic architecture, biological systems frequently consist of extremely-dense and complex protein networks such as those in synapses. Understanding in detail, the proteomic organization of synapse is of great interest as it regulates synaptic transmission and slight variations in the protein organization has been implicated in neural diseases. idExM was employed prepared mouse brain slices to decipher the nanoscale structure of synapses. The sample was stained with primary and secondary antibodies after the expansion process. FIG. 2 shows the imaging of two synaptic proteins bassoon (pre-synaptic) and PSD-95 (post-synaptic) in the mouse brain cortex. While before expansion or with 4.5× expansion, the synaptic organization of these two proteins is not clearly observable, after 20× expansion, the two proteins are distinctively resolved.

Example-4. Nanoscale Imaging of RNA in Cultured Cells

Figure 3A:
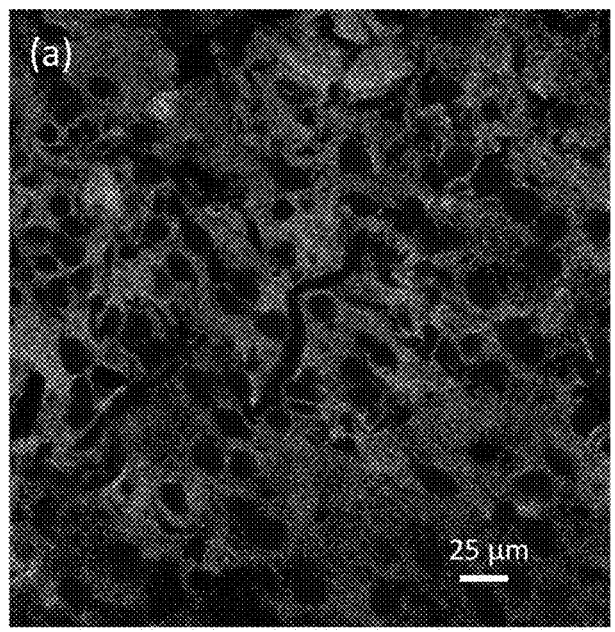
FIG. 3A through FIG. 3F—Nanoscale imaging of dense protein structures in synapse. Confocal images showing synaptic proteins Bassoon (green) and PSD95 (red) without (a), after 5× (b) and 20× (c) expansion in the mouse cortex. (d), (e), and (f) are close-up views of images corresponding to (a), (b) and (c) respectively. Staining is done after expansion with off-the-shelf antibodies. All scale bars are post-expansion.
Figure 3B:
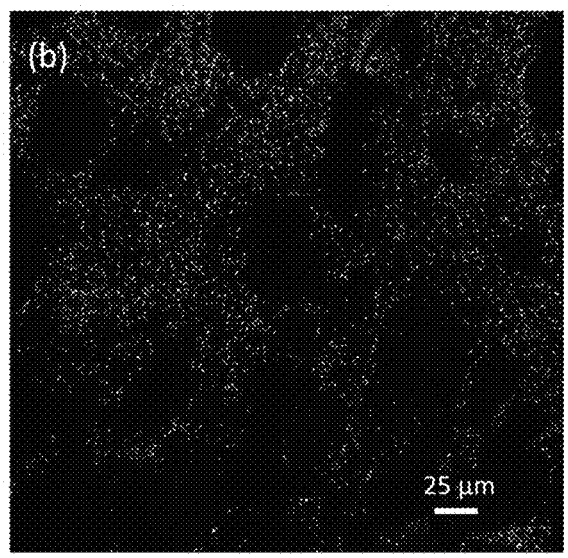
Figure 3C:
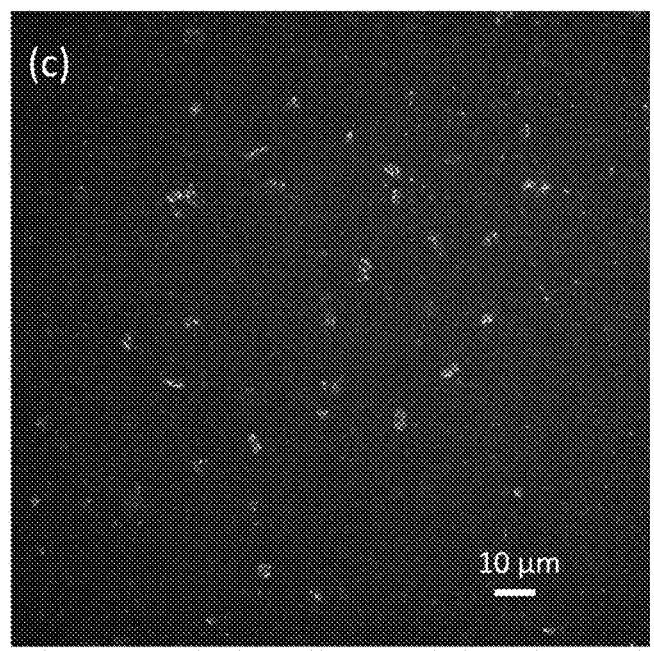
Figure 3D:
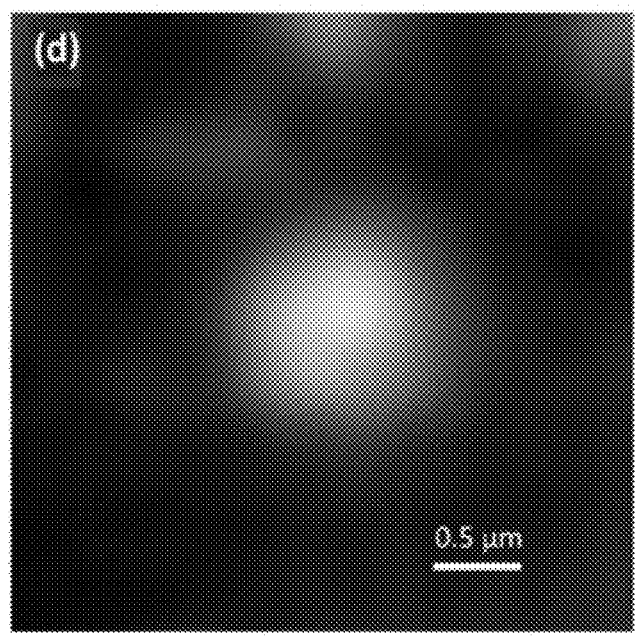
Figure 3E:
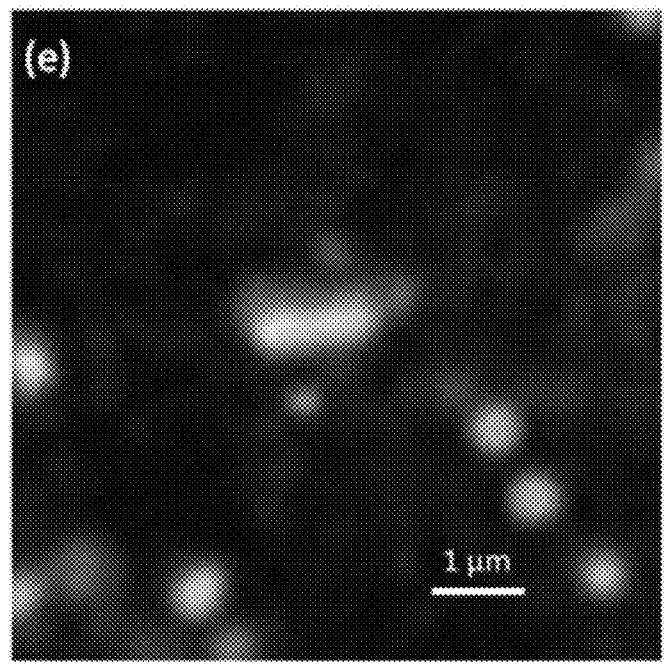
Figure 3F:
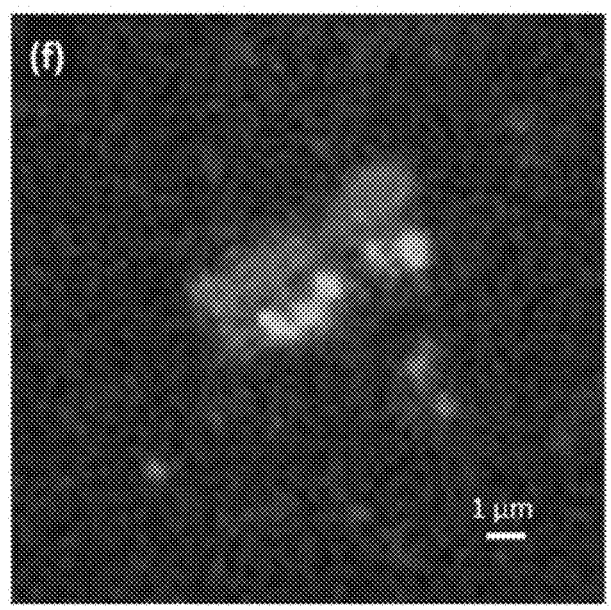

Nanoscale resolution imaging of RNA is critical for identifying cell types, distinguish between normal and pathological states of cell as well as understanding local RNA processing. Apart from proteomic mapping, idExM was applied for nanoscale imaging of RNA. For high-resolution imaging of RNA, a bifunctional crosslinker (such as the mixing of Label-IT Amine and 6-((acryloyl)amino) hexanoic acid which provide an alkylating group that primarily reacts to the N7 of guanine and an acrylamide moiety that can get incorporated in the swellable material during or after polymerization) was used to anchor the nucleic acid to the swellable material network. Read out of the RNA was done using fluorescent in-situ hybridization (FISH) technique. FIG. 3 shows the wide-field image showing UbiquitinC RNA smFISH staining before (a) and after about 10× expansion (b). While the denser RNA domains are not resolved before expansion, they are clearly resolved after expansion as clear from the inset images. FIG. 3(c) shows the wide-field image of NEAT1 smFISH staining in the nuclei of cultured HeLa cells after ~10× expansion. Maximum intensity projection (MIP) image, as well as representative images taken at different heights axially along the cluster, is shown. These images illustrate the capability of idExM in nanoscale imaging of RNA.

Example-5. Nanoscale RNA Imaging in the Mouse Brain Tissue

Figure 4A:
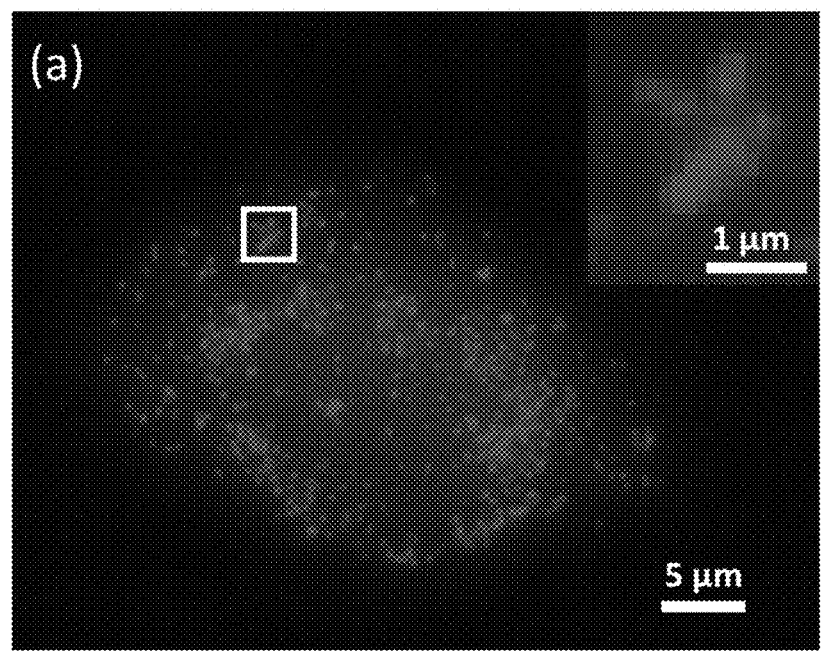
FIG. 4A through FIG. 4C—Nanoscale imaging of RNA in cultured cells. Wide-field image showing UbiquitinC RNA smFISH staining before (a) and after about 10× expansion (b). While the denser RNA domains are not resolved before expansion, they are clearly resolved after expansion as clear from the inset images. (c) Wide-field image showing NEAT1 smFISH staining in the nuclei of cultured HeLa cells after ~10× expansion. Maximum intensity projection (MIP) image, as well as representative images taken at different heights axially along the cluster, is shown. All scale bars are post-expansion.
Figure 4B:
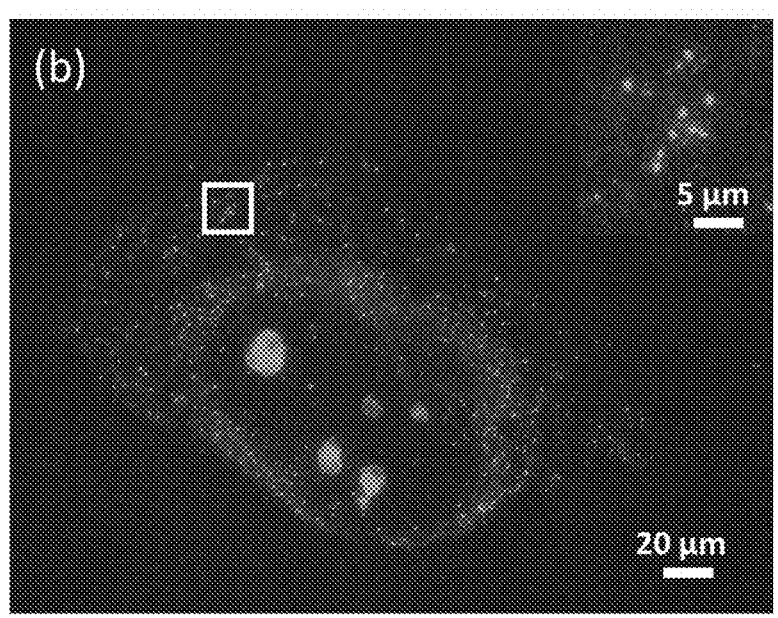
Figure 4C:
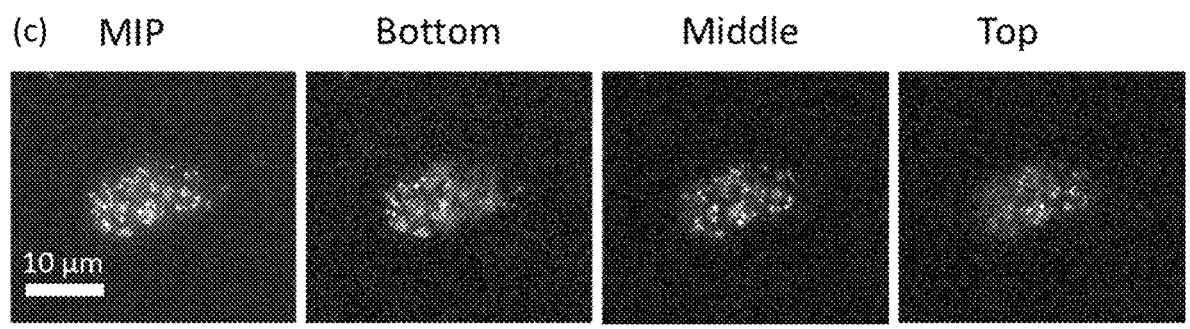
Figure 5A:
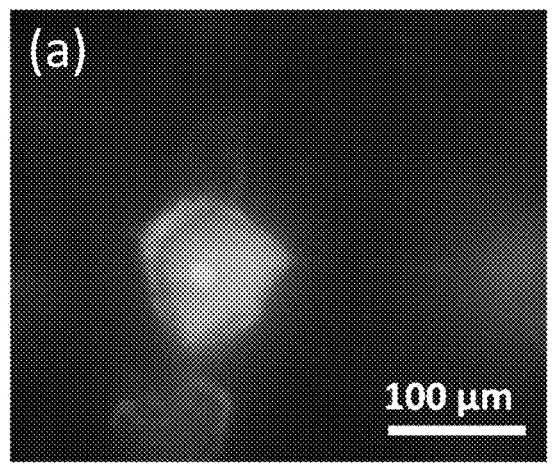
FIG. 5A through FIG. 5E—Nanoscale RNA imaging in the mouse brain tissue. (a) Wide-field image showing HCR-FISH staining performed against the 28s rRNA (red) in a Thy1-YFP mouse brain slice (cortex) after ~10× expansion. Representative images of 28s rRNA staining in neurons expressing YFP (green) is shown. (b) Wide-field image showing the distribution of 28s rRNA in dendrites. Confocal images of HCR-FISH staining performed against the beta-actin mRNA with two color imaging shown in magenta (d) and red (e) in a neuron expressing GFP (c) in a Thy1-YFP mouse brain slice (cortex). All scale bars are post-expansion.
Figure 5B:
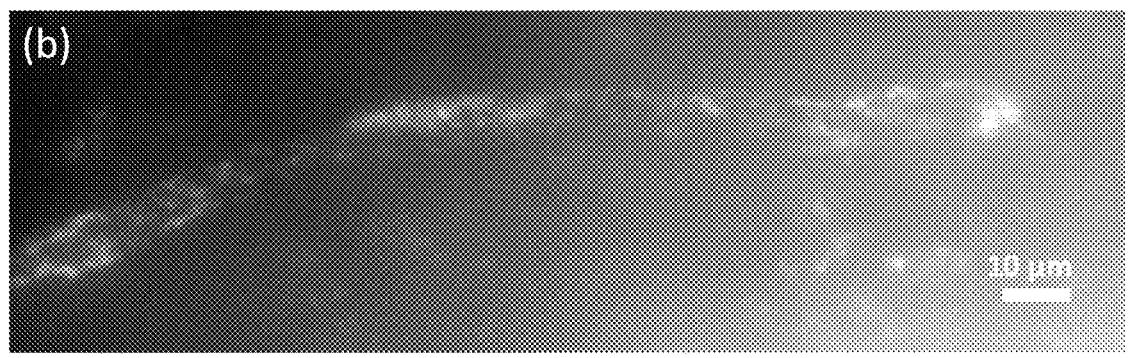
Figure 5C:
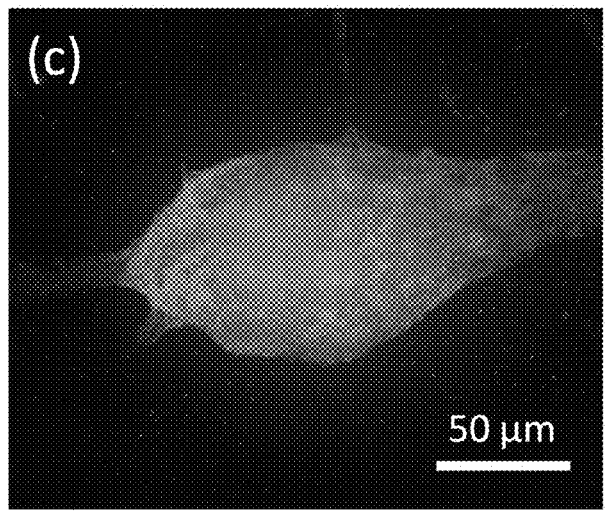
Figure 5D:
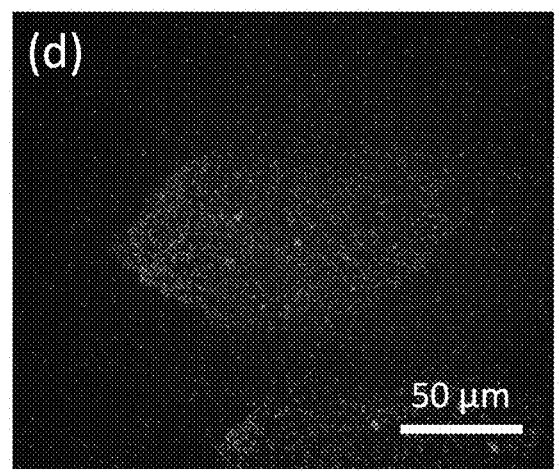
Figure 5E:
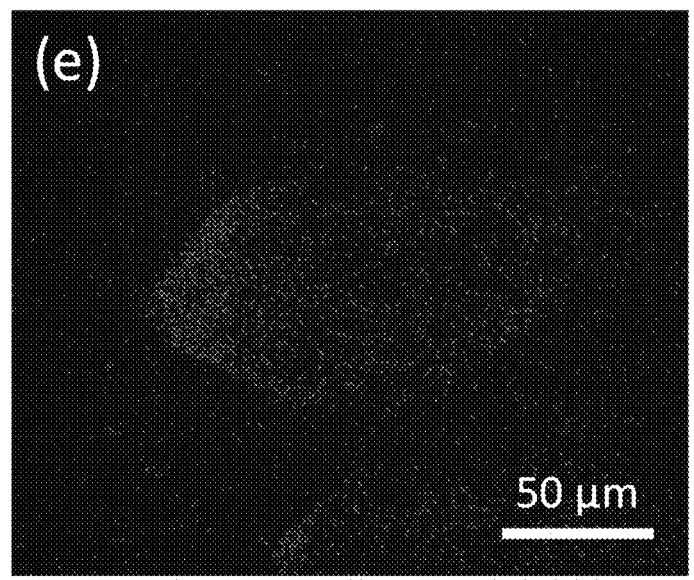

Apart from cultured cells, idExM was applied to image RNA in mouse brain tissue samples, which were then subjected to FISH staining. FIG. 4 (a) show wide-field image of HCR-FISH staining performed against the 28s rRNA (red) in a Thy1-YFP mouse brain slice (cortex) after ~10× expansion. Representative images of 28s rRNA staining in neurons expressing YFP (green) is shown. (b) Wide-field image showing the distribution of 28s rRNA in dendrites. Confocal images of HCR-FISH staining performed against the beta-actin mRNA with two color imaging are shown in magenta (d) and red (e) in a neuron expressing GFP (c) in a Thy1-YFP mouse brain slice (cortex). These images illustrate that it is not only possible to use idExM for nanoscale imaging of RNA in cultured cells but also in mouse brain tissue.

Example 6

Mouse brain tissue was prepared by idExM according to Example 2.

Figure 6A:
FIG. 6A and FIG. 6B—Confocal image of mouse brain tissue after post-expansion staining with idExM.
Figure 6B:
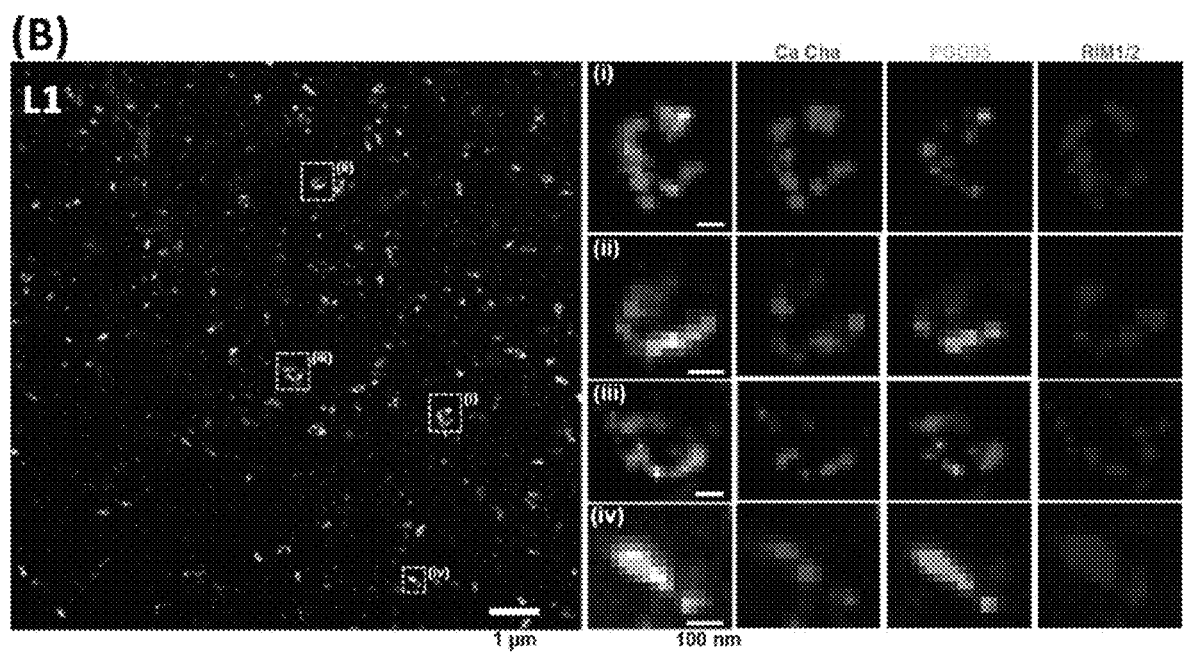
Figure 7A:
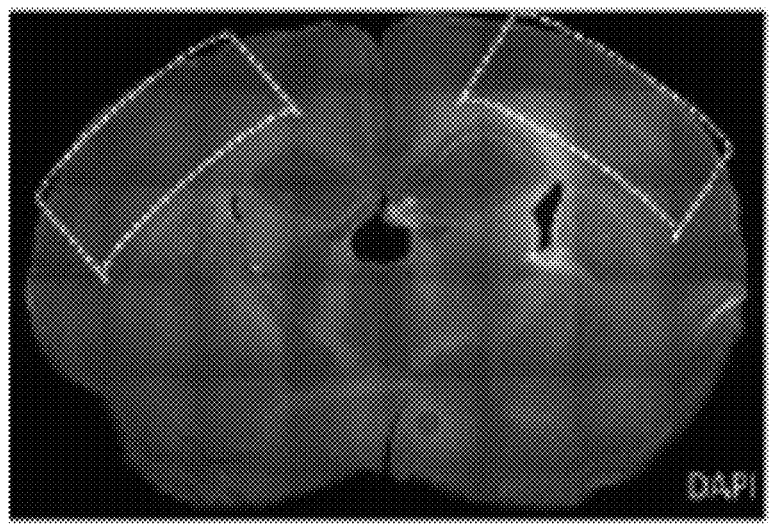
FIG. 7A through FIG. 7I—Nanoscale-resolution imaging of synapses with idExM.
Figure 7B:
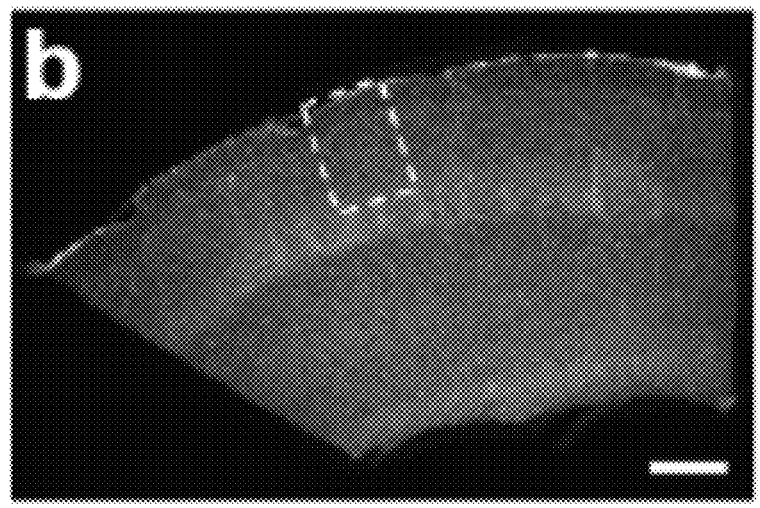
Figure 7C:
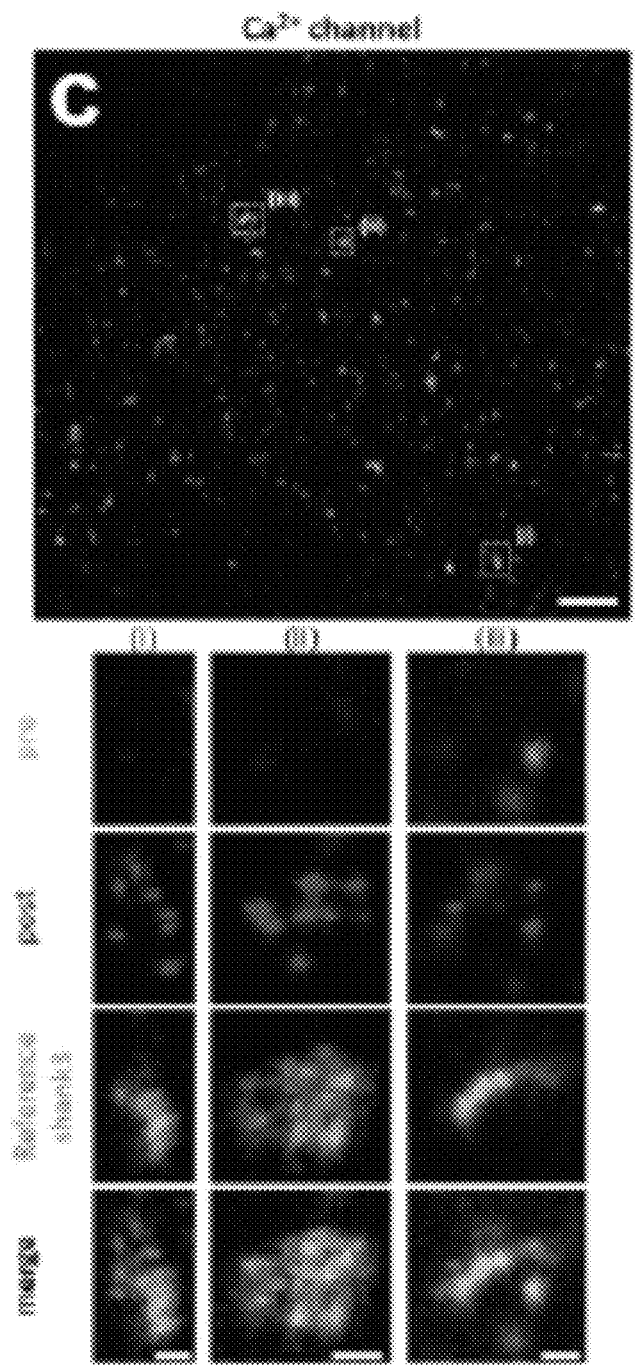
Figure 7D:
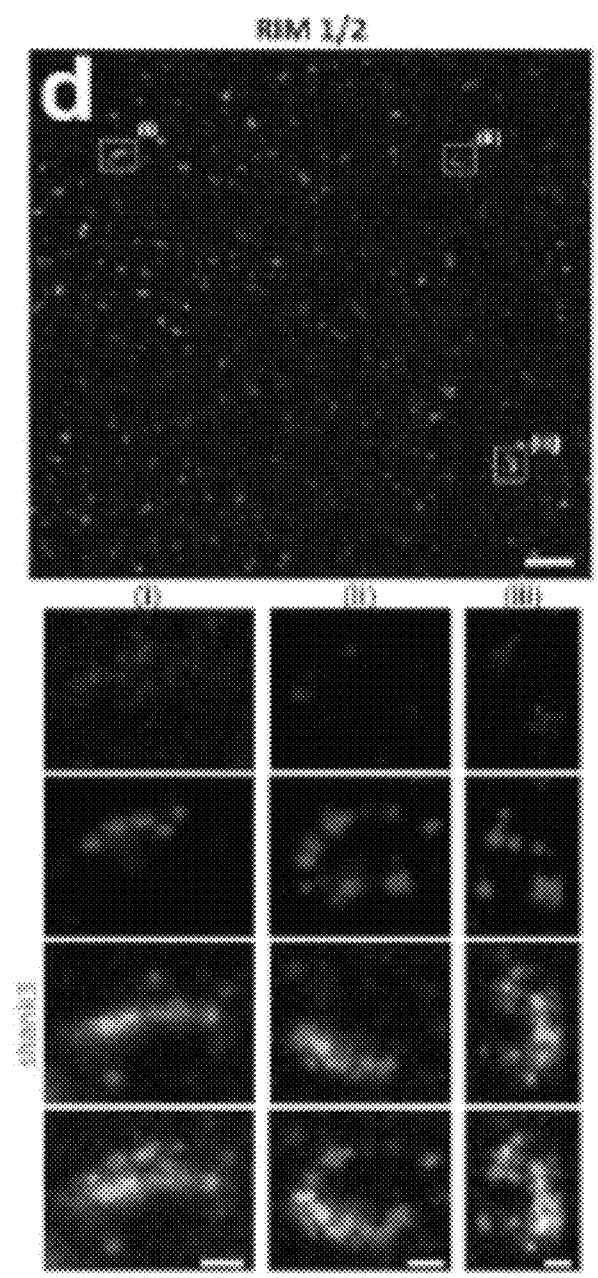
Figure 7E:
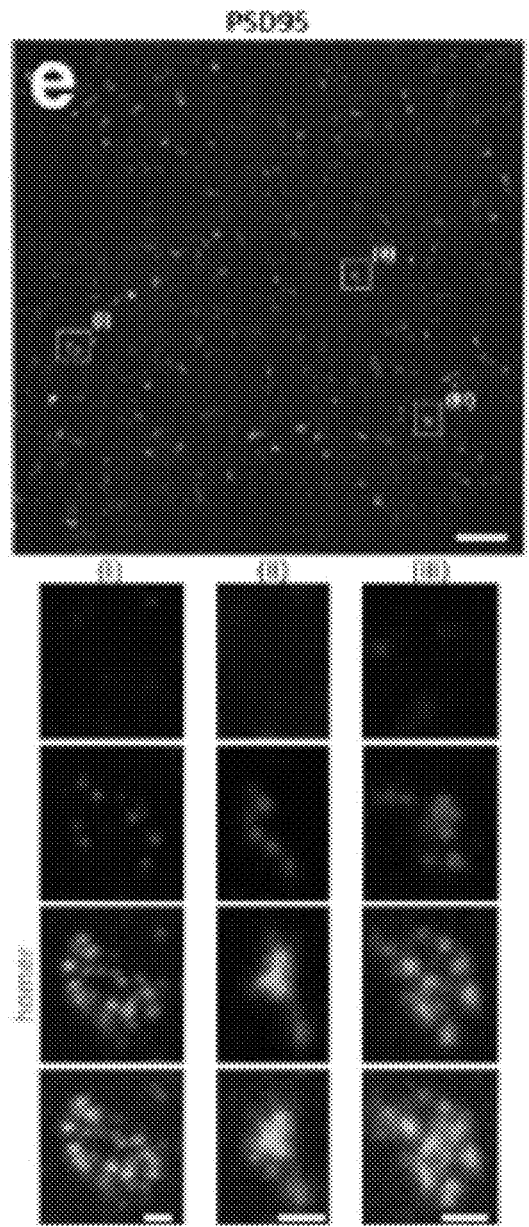
Figure 7F:
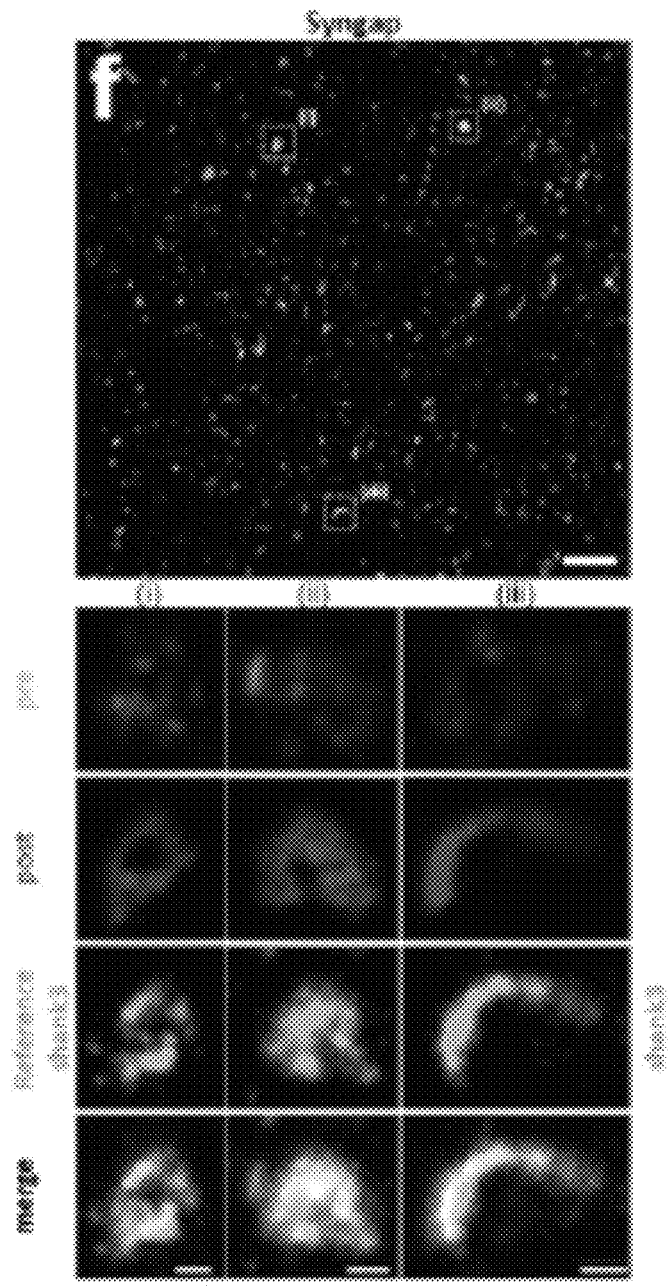
Figure 7G:
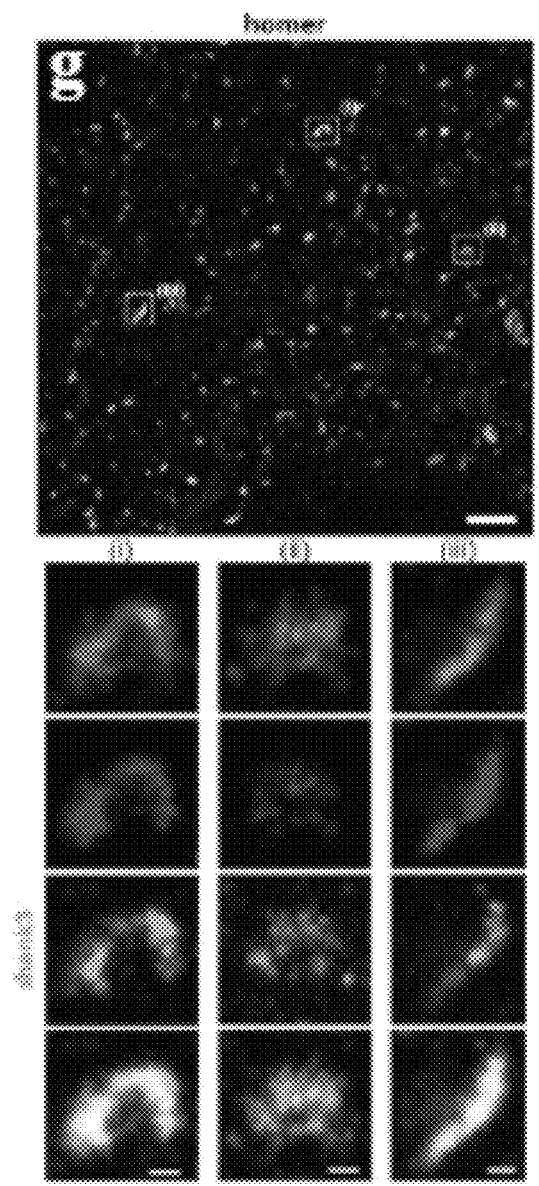
Figure 7H:
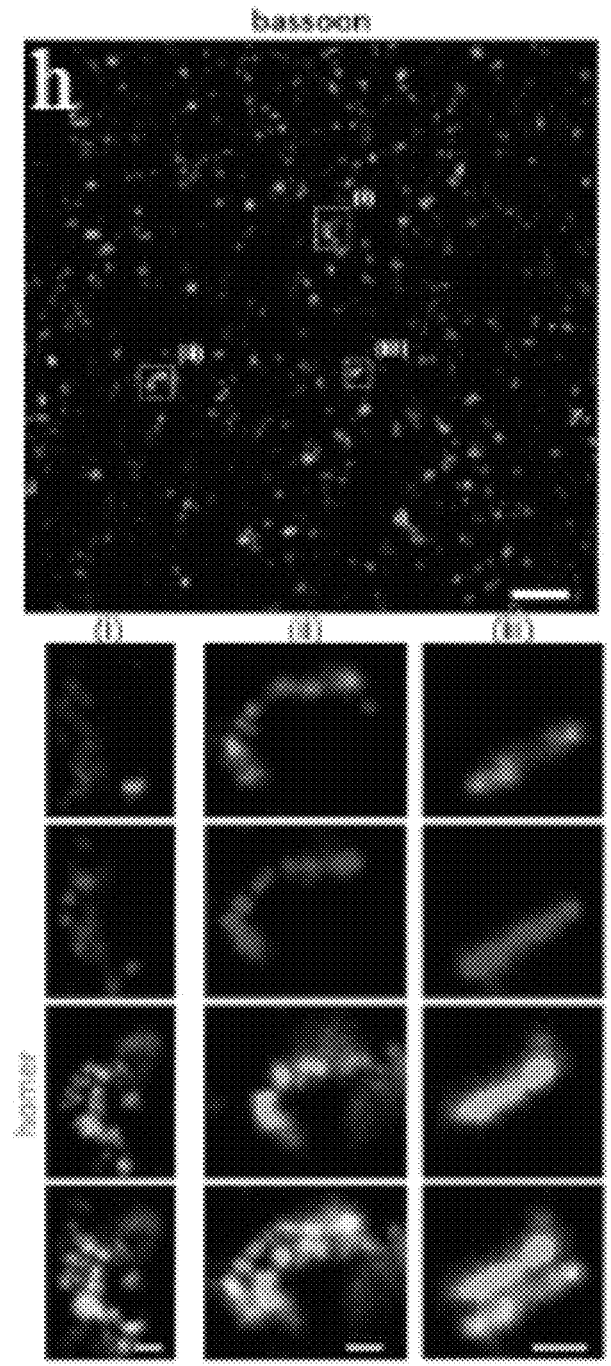
Figure 7I:
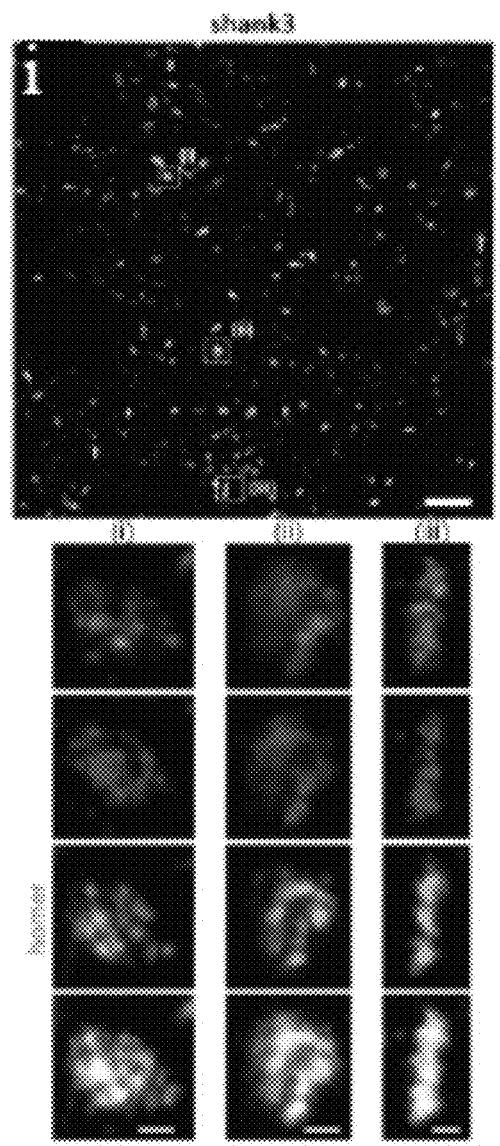

FIGS. 6A and 6B depict confocal images of mouse brain tissue after post-expansion staining with idExM. (A) Low-magnification widefield image of a mouse brain slice stained with DAPI showing the somatosensory cortex region imaged after expansion in (B). (B) Confocal image of Layer 1 somatosensory cortex after post-expansion immunostaining with antibodies against P/Q-type calcium channel (red), PSD-95 (green) and RIM1/2 (blue). (i-iv) shows confocal images of highlighted four regions.

FIG. 7A through FIG. 7I depict nanoscale-resolution imaging of synapses with idExM. (a-b) provide a low-magnification widefield image of a mouse brain slice with DAPI staining showing the somatosensory cortex region. Confocal images of the specimen after immunostaining with antibodies against calcium channel (c), RIM1/2 (d), PSD95 (e), Syngap (f), Homer1 (g), Bassoon (h), and Shank3 (i). For pre-expansion staining, primary and secondary antibodies were applied before expansion, secondary antibodies were anchored to the gel by AcX treatment, and tertiary antibodies were applied after expansion to visualize the pre-expansion staining. For post-expansion staining, the same primary and secondary antibodies were applied after expansion. Antibodies against Shank3 (c, d, f, g) or Homer1 (e, h, i) were used as a reference channel after expansion to help identify putative synapses. Confocal images of Cortex Layers 2/3 (top) showing merged pre-, post-expansion staining and reference channels. Below f-i, zoomed-in images of putative synapses (i-iii) show separate channels for pre-expansion staining (green), post-expansion staining (red), reference staining (cyan), and merge.

The patent and scientific literature referred to herein establishes the knowledge that is available to those with skill in the art. All United States patents and published or unpublished United States patent applications cited herein are incorporated by reference. All published foreign patents and patent applications cited herein are hereby incorporated by reference. All other published references, documents, manuscripts and scientific literature cited herein are hereby incorporated by reference.

While this invention has been particularly shown and described with references to preferred embodiments thereof, it will be understood by those skilled in the art that various changes in form and details may be made therein without departing from the scope of the invention encompassed by the appended claims. It should also be understood that the preferred embodiments described herein are not mutually exclusive and that features from the various preferred embodiments may be combined in whole or in part in accordance with the invention.

What is claimed is:

1. A method for iteratively enlarging a sample of interest comprising biomolecules for microscopy, the method comprising the steps of:
   a) contacting the sample with a biomolecule anchoring agent (BAA), wherein the BAA comprises a biomolecule binding moiety and an anchor;
   b) embedding the sample in a first swellable material, wherein the biomolecules in the sample anchor to the first swellable material;
   c) subjecting the sample to a disruption of the endogenous physical structure of the sample;
   d) swelling the first swellable material resulting in an enlargement of the sample;
   e) re-embedding the enlarged sample in a non-swellable material to form an enlarged sample hybrid;
   f) embedding the enlarged sample hybrid in a second swellable material, wherein the second swellable material is the same as the first swellable material; and
   g) swelling the second swellable material to further enlarge the sample,
   wherein the biomolecules in the sample remain anchored to the first swellable material.

2. The method according to claim 1, wherein embedding the sample in the first swellable material in step b) comprises permeating the sample with a composition comprising one or more water soluble monomer precursors; and polymerizing the composition within the sample to form the first swellable material, wherein said polymerizing results in anchoring of the biomolecules of the sample to the first swellable material to form a sample-swellable material complex.

3. The method according to claim 1, wherein embedding the sample in the second swellable material in step f) comprises permeating the sample with a composition comprising one or more water soluble monomer precursors; and polymerizing the composition within the sample to form the second swellable material, wherein the biomolecules remain anchored to the first swellable material.

4. The method according to claim 2, wherein the composition comprises at least one polyelectrolyte monomer and a covalent crosslinker.

5. The method according to claim 2, wherein the first swellable material is a hydrogel.

6. The method according to claim 5, wherein the hydrogel is a polyacrylate hydrogel.

7. The method according to claim 6, wherein the composition comprises acrylate, acrylamide, and a crosslinker selected from N,N-methylenebisacrylamide (BIS), N,N'-(1,2-Dihydroxyethylene)bisacrylamide)(DHEBA), and N,N'-Bis(acryloyl)cystamine(BAC).

8. The method according to claim 1, wherein re-embedding the enlarged sample in the non-swellable material in step e) comprises permeating the enlarged sample with a composition comprising precursors of a non-swellable material and polymerizing the composition within the enlarged sample to form a non-swellable material.

9. The method according to claim 1, wherein prior to step g) a slice of the sample is taken and swelled.

10. The method according to claim 2, wherein swelling the first swellable material in step d) comprises adding an aqueous solvent or liquid to cause the sample-swellable material complex to swell, thereby physically expanding the sample-swellable material complex, which results in an enlarged sample.

11. The method according to claim 10, wherein the aqueous solvent or liquid is water.

12. The method according to claim 1, further comprising the step of producing a high-resolution image of the sample by viewing the enlarged sample under a microscope.

13. The method according to claim 1, further comprising the step of optically imaging the enlarged sample by viewing the sample under a microscope.

14. The method according to claim 3, wherein the composition comprises at least one polyelectrolyte monomer and a covalent crosslinker.

15. The method according to claim 3, wherein the second swellable material is a hydrogel.

16. The method according to claim 15, wherein the hydrogel is a polyacrylate hydrogel.

17. The method according to claim 16, wherein the composition comprises acrylate, acrylamide, and a crosslinker selected from N,N-methylenebisacrylamide (BIS), N,N'-(1,2-Dihydroxyethylene)bisacrylamide)(DHEBA), and N,N'-Bis(acryloyl)cystamine(BAC).

18. A method for iteratively enlarging a sample of interest comprising biomolecules for microscopy, the method comprising the steps of:
   a) contacting the sample with a biomolecule anchoring agent (BAA), wherein the BAA comprises a biomolecule binding moiety and an anchor;
   b) embedding the sample in a first swellable material, wherein the biomolecules in the sample anchor to the first swellable material;
   c) subjecting the sample to a disruption of the endogenous physical structure of the sample;
   d) swelling the first swellable material resulting in an enlargement of the sample;
   e) re-embedding the enlarged sample in a non-swellable material to form an enlarged sample hybrid;
   f) embedding the enlarged sample hybrid in a second swellable material, wherein the second swellable material is different than the first swellable material; and
   g) swelling the second swellable material to further enlarge the sample,
   wherein the biomolecules in the sample remain anchored to the first swellable material.

19. The method according to claim 18, wherein embedding the sample in the first swellable material in step b) comprises permeating the sample with a composition comprising one or more water soluble monomer precursors; and polymerizing the composition within the sample to form the first swellable material, wherein said polymerizing results in anchoring of the biomolecules of the sample to the first swellable material to form a sample-swellable material complex.

20. The method according to claim 18, wherein embedding the sample in the second swellable material in step f)

comprises permeating the sample with a composition comprising one or more water soluble monomer precursors; and polymerizing the composition within the sample to form the second swellable material, wherein the biomolecules remain anchored to the first swellable material.

21. The method according to claim 19, wherein the composition comprises at least one polyelectrolyte monomer and a covalent crosslinker.

22. The method according to claim 19, wherein the first swellable material is a hydrogel.

23. The method according to claim 22, wherein the hydrogel is a polyacrylate hydrogel.

24. The method according to claim 23, wherein the composition comprises acrylate, acrylamide, and a crosslinker selected from N,N-methylenebisacrylamide (BIS), N,N'-(1,2-Dihydroxyethylene)bisacrylamide)(DHEBA), and N,N'-Bis(acryloyl)cystamine(BAC).

25. The method according to claim 18, wherein re-embedding the enlarged sample in the non-swellable material in step e) comprises permeating the enlarged sample with a composition comprising precursors of a non-swellable material and polymerizing the composition within the enlarged sample to form a non-swellable material.

26. The method according to claim 18, wherein prior to step g) a slice of the sample is taken and swelled.

27. The method according to claim 19, wherein swelling the first swellable material in step d) comprises adding an aqueous solvent or liquid to cause the sample-swellable material complex to swell, thereby physically expanding the sample-swellable material complex, which results in an enlarged sample.

28. The method according to claim 27, wherein the aqueous solvent or liquid is water.

29. The method according to claim 18, further comprising the step of producing a high-resolution image of the sample by viewing the enlarged sample under a microscope.

30. The method according to claim 18, further comprising the step of optically imaging the enlarged sample by viewing the sample under a microscope.

31. The method according to claim 20, wherein the composition comprises at least one polyelectrolyte monomer and a covalent crosslinker.

32. The method according to claim 20, wherein the second swellable material is a hydrogel.

33. The method according to claim 32, wherein the hydrogel is a polyacrylate hydrogel.

34. The method according to claim 33, wherein the composition comprises acrylate, acrylamide, and a crosslinker selected from N,N-methylenebisacrylamide (BIS), N,N'-(1,2-Dihydroxyethylene)bisacrylamide)(DHEBA), and N,N'-Bis(acryloyl)cystamine(BAC).

* * * * *